US011556500B2

(12) United States Patent
Giloni et al.

(10) Patent No.: US 11,556,500 B2
(45) Date of Patent: Jan. 17, 2023

(54) SESSION TEMPLATES

(71) Applicant: Oracle International Corporation, Redwood Shores, CA (US)

(72) Inventors: Jonathan Giloni, Foster City, CA (US); Kevin S. Neel, San Mateo, CA (US); Carol L. Colrain, Redwood Shores, CA (US); Douglas Surber, Orinda, CA (US); Ravi Thammaiah, Redwood Shores, CA (US); Tong Zhou, Merrick, NY (US); Arturo Ismael Quinto, Guadalajara (MX); Manoj Dhanapal, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 284 days.

(21) Appl. No.: 16/147,367

(22) Filed: Sep. 28, 2018

(65) Prior Publication Data
US 2019/0102267 A1     Apr. 4, 2019

Related U.S. Application Data

(60) Provisional application No. 62/566,253, filed on Sep. 29, 2017.

(51) Int. Cl.
*G06F 16/00*     (2019.01)
*G06F 16/11*     (2019.01)
(Continued)

(52) U.S. Cl.
CPC ........ *G06F 16/122* (2019.01); *G06F 11/2023* (2013.01); *G06F 16/21* (2019.01);
(Continued)

(58) Field of Classification Search
CPC ............. G06F 11/1471; G06F 11/1474; G06F 11/2023; G06F 16/122; G06F 16/21;
(Continued)

(56) References Cited

U.S. PATENT DOCUMENTS 5,013,222 A     5/1991  Sokol et al.
5,680,610 A     10/1997 Smith et al.
(Continued)

FOREIGN PATENT DOCUMENTS

EP     0942363 A2     9/1999
EP     0992909 A2     4/2000
(Continued)

OTHER PUBLICATIONS

Ying-Dar Lin et al., "Direct Web Switch Routing with State Migration, TCP Masquerade, and Cookie Name Rewriting," IEEE Global Telecommunications Conference, Dec. 1, 2003, pp. 3663-3667.

(Continued)

*Primary Examiner* — Shew Fen Lin
(74) *Attorney, Agent, or Firm* — Hickman Becker Bingham Ledesma LLP

(57) ABSTRACT

Techniques are disclosed herein for identifying, recording and restoring the state of a database session and various aspects thereof. A session template data structure is generated that includes session attribute values describing various aspects of the session that is established between a client system and a database management system (DBMS and enables the client system to issue to the DBMS commands for execution. Based on the session attribute values, DBMS may generate a template identifier corresponding to the session template data structure. The template identifier may be stored in an association with the session state that it partially (or in whole) represents. In an embodiment, when (Continued)

another state of a session is captured, if the template identifier for the state is the same, then rather than storing the attribute-value pairs for the other state, the template identifier is further associated with the other state. In an embodiment, a request boundary is detected where the session is known to be at a recoverable point. If recovery of the session is needed, the session state is restored, and replay of commands start from this point. Each command replayed is verified to produce the same session state as it produced at original execution. If the session is determined to be a safe point, then all the commands recorded for replay prior to the safe point may be deleted.

In an embodiment, the template is used to set the initial state when borrowing from a session pool The state tracking is also used to know that the session can be failed over safely during planned operation as the session is unlikely to drain by itself even when not used.

20 Claims, 9 Drawing Sheets

(51) Int. Cl.
*H04L 67/141* (2022.01)
*H04L 67/142* (2022.01)
*G06F 16/21* (2019.01)
*G06F 16/25* (2019.01)
*G06F 11/20* (2006.01)

(52) U.S. Cl.
CPC .......... *G06F 16/252* (2019.01); *H04L 67/141* (2013.01); *H04L 67/142* (2013.01); *G06F 2201/80* (2013.01)

(58) Field of Classification Search
CPC ............... G06F 16/2358; G06F 16/252; G06F 2201/80; G06F 16/27; H04L 67/141; H04L 67/142; H04L 67/1097
See application file for complete search history.

(56) References Cited

U.S. PATENT DOCUMENTS

| | | | |
|---|---|---|---|
| 5,758,345 A | 5/1998 | Wang | |
| 5,774,668 A | 6/1998 | Choquier et al. | |
| 5,890,167 A | 3/1999 | Bridge et al. | |
| 5,907,848 A * | 5/1999 | Zaiken | G06Q 40/02 |
| 5,913,029 A * | 6/1999 | Shostak | H04L 29/06 |
| | | | 709/203 |
| 5,918,059 A | 6/1999 | Tavallaei et al. | |
| 5,951,694 A | 9/1999 | Choquier et al. | |
| 6,041,357 A | 3/2000 | Kunzelman et al. | |
| 6,088,728 A | 7/2000 | Bellemore et al. | |
| 6,094,684 A | 7/2000 | Pallmann | |
| 6,105,067 A | 8/2000 | Batra | |
| 6,145,121 A | 11/2000 | Levy et al. | |
| 6,167,405 A | 12/2000 | Rosensteel et al. | |
| 6,178,529 B1 | 1/2001 | Short et al. | |
| 6,182,139 B1 | 1/2001 | Brendel | |
| 6,243,751 B1 | 6/2001 | Chatterjee et al. | |
| 6,272,503 B1 | 8/2001 | Bridge et al. | |
| 6,327,622 B1 | 12/2001 | Jindal et al. | |
| 6,347,313 B1 | 2/2002 | Ma et al. | |
| 6,442,552 B1 | 8/2002 | Frolund | |
| 6,556,659 B1 | 4/2003 | Bowman-Amuah | |
| 6,587,866 B1 | 7/2003 | Modi et al. | |
| 6,601,101 B1 | 7/2003 | Lee et al. | |
| 6,667,751 B1 | 12/2003 | Wynn et al. | |
| 6,728,747 B1 | 4/2004 | Jenkins | |
| 6,728,748 B1 | 4/2004 | Mangipudi et al. | |
| 6,769,054 B1 | 7/2004 | Sahin et al. | |
| 6,775,826 B1 | 8/2004 | Zahavi et al. | |
| 6,813,731 B2 | 11/2004 | Zahavi et al. | |
| 6,816,907 B1 | 11/2004 | Mei et al. | |
| 6,868,445 B1 | 3/2005 | Chebrolu | |
| 6,877,095 B1 | 4/2005 | Allen | |
| 6,925,477 B1 | 8/2005 | Champagne et al. | |
| 7,024,394 B1 | 4/2006 | Ashour et al. | |
| 7,058,957 B1 | 6/2006 | Nguyen | |
| 7,107,294 B2 | 9/2006 | Romanufa et al. | |
| 7,174,379 B2 | 2/2007 | Agarwal et al. | |
| 7,178,050 B2 | 2/2007 | Fung et al. | |
| 7,194,761 B1 | 3/2007 | Champagne | |
| 7,263,590 B1 | 8/2007 | Todd et al. | |
| 7,269,157 B2 | 9/2007 | Klinker et al. | |
| 7,277,945 B1 | 10/2007 | Shah et al. | |
| 7,328,268 B1 * | 2/2008 | Foltak | H04L 63/0272 |
| | | | 709/227 |
| 7,415,522 B2 | 8/2008 | Kaluskar et al. | |
| 7,536,462 B2 | 5/2009 | Pandya | |
| 7,552,218 B2 | 6/2009 | Kaluskar | |
| 7,631,107 B2 | 12/2009 | Pandya | |
| 7,761,435 B2 | 7/2010 | Stanev | |
| 7,849,173 B1 | 12/2010 | Uhlik | |
| 7,849,177 B2 | 12/2010 | Uhlik | |
| 7,853,698 B2 | 12/2010 | Stanev | |
| 8,005,966 B2 | 8/2011 | Pandya | |
| 8,024,299 B2 | 9/2011 | Dias et al. | |
| 8,918,525 B2 * | 12/2014 | Banes | H04L 67/327 |
| | | | 709/229 |
| 9,094,299 B1 * | 7/2015 | Rao D.S | H04L 41/0803 |
| 9,323,922 B2 | 4/2016 | Muralidharan | |
| 2001/0056493 A1 | 12/2001 | Mineo | |
| 2002/0073019 A1 | 6/2002 | Deaton | |
| 2002/0073139 A1 | 6/2002 | Hawkins et al. | |
| 2002/0116457 A1 | 8/2002 | Eshleman et al. | |
| 2002/0129157 A1 | 9/2002 | Varsano | |
| 2002/0161896 A1 | 10/2002 | Wen et al. | |
| 2002/0194015 A1 | 12/2002 | Gordon et al. | |
| 2003/0005028 A1 | 1/2003 | Dritschler et al. | |
| 2003/0007497 A1 | 1/2003 | March et al. | |
| 2003/0028654 A1 | 2/2003 | Abjanic et al. | |
| 2003/0063122 A1 | 4/2003 | Cichowlas et al. | |
| 2003/0088671 A1 | 5/2003 | Klinker et al. | |
| 2003/0108052 A1 | 6/2003 | Inou et al. | |
| 2003/0131045 A1 | 7/2003 | McGee et al. | |
| 2003/0135642 A1 | 7/2003 | Beneddetto et al. | |
| 2003/0204769 A1 | 10/2003 | Coughlin | |
| 2003/0208523 A1 | 11/2003 | Gopalan | |
| 2003/0217159 A1 | 11/2003 | Schramm-Apple et al. | |
| 2004/0003041 A1 | 1/2004 | Moore et al. | |
| 2004/0015600 A1 | 1/2004 | Tiwary et al. | |
| 2004/0078602 A1 | 4/2004 | Rothbarth et al. | |
| 2004/0111506 A1 | 6/2004 | Kundu et al. | |
| 2004/0117794 A1 | 6/2004 | Kundu | |
| 2004/0176996 A1 | 9/2004 | Powers et al. | |
| 2004/0216109 A1 | 10/2004 | Bhogi et al. | |
| 2004/0221115 A1 | 11/2004 | Sahin et al. | |
| 2004/0268357 A1 | 12/2004 | Joy | |
| 2005/0021514 A1 | 1/2005 | Barga et al. | |
| 2005/0021771 A1 | 1/2005 | Kaehn et al. | |
| 2005/0038849 A1 | 2/2005 | Kaluskar et al. | |
| 2005/0050116 A1 | 3/2005 | Gross et al. | |
| 2005/0055383 A1 | 3/2005 | Dias et al. | |
| 2005/0131879 A1 | 6/2005 | Ghosh et al. | |
| 2005/0132222 A1 | 6/2005 | Petrovic | |
| 2005/0165925 A1 | 7/2005 | Dan et al. | |
| 2005/0186975 A1 | 8/2005 | Yach et al. | |
| 2005/0228834 A1 | 10/2005 | Shinkai | |
| 2005/0239476 A1 | 10/2005 | Betrabet et al. | |
| 2005/0267965 A1 | 12/2005 | Heller | |
| 2006/0036617 A1 | 2/2006 | Bastawala et al. | |
| 2006/0248036 A1 * | 11/2006 | Stanev | G06F 9/45533 |
| 2006/0282422 A1 | 12/2006 | Al-Omari | |
| 2007/0067266 A1 | 3/2007 | Lomet | |
| 2007/0226218 A1 | 9/2007 | Chatterjee et al. | |
| 2007/0226323 A1 | 9/2007 | Halpern | |
| 2007/0261054 A1 | 11/2007 | Chesebro et al. | |
| 2008/0010240 A1 | 1/2008 | Zait | |
| 2008/0097960 A1 | 4/2008 | Dias et al. | |
| 2008/0097961 A1 | 4/2008 | Dias et al. | |

(56) References Cited

U.S. PATENT DOCUMENTS

| | | |
|---|---|---|
| 2008/0097995 A1 | 4/2008 | Dias et al. |
| 2008/0097996 A1 | 4/2008 | Dias et al. |
| 2008/0098003 A1 | 4/2008 | Dias et al. |
| 2008/0098048 A1 | 4/2008 | Cao |
| 2008/0134219 A1 | 6/2008 | Dorrance et al. |
| 2008/0228834 A1 | 9/2008 | Burchall et al. |
| 2008/0285945 A1* | 11/2008 | Rajakarunanayake ............... H04N 21/43622 386/235 |
| 2009/0043778 A1* | 2/2009 | Jambunathan ........ G06F 16/254 |
| 2009/0077135 A1 | 3/2009 | Yalamanchi et al. |
| 2009/0100180 A1 | 4/2009 | Chidambaran et al. |
| 2009/0182787 A1 | 7/2009 | Parkinson |
| 2009/0327468 A1 | 12/2009 | Hirsch |
| 2010/0005097 A1 | 1/2010 | Liang et al. |
| 2010/0030818 A1 | 2/2010 | Cooper et al. |
| 2010/0036957 A1* | 2/2010 | Patel ................ H04L 67/148 709/227 |
| 2010/0042601 A1 | 2/2010 | Kelley et al. |
| 2010/0063982 A1 | 3/2010 | Lawrence |
| 2010/0293137 A1 | 11/2010 | Zukerman et al. |
| 2010/0318394 A1 | 12/2010 | Nayak et al. |
| 2011/0212783 A1 | 9/2011 | Dale |
| 2011/0218981 A1 | 9/2011 | Retnakumari et al. |
| 2011/0246419 A1 | 10/2011 | Yancey |
| 2011/0258630 A1 | 10/2011 | Fee |
| 2012/0179645 A1 | 7/2012 | Lomet et al. |
| 2013/0066837 A1 | 3/2013 | Colrain et al. |
| 2013/0066948 A1 | 3/2013 | Colrain et al. |
| 2013/0066949 A1 | 3/2013 | Colrain et al. |
| 2013/0066952 A1* | 3/2013 | Colrain ............. G06F 11/1438 709/203 |
| 2013/0066955 A1 | 3/2013 | Neel et al. |
| 2013/0097307 A1* | 4/2013 | Vazac ............... G06F 11/3414 709/224 |
| 2013/0297566 A1 | 11/2013 | Colrain |
| 2013/0304714 A1 | 11/2013 | Lee et al. |
| 2014/0095547 A1 | 4/2014 | Guo et al. |
| 2014/0101117 A1* | 4/2014 | Uzzaman ............ G06F 16/215 707/694 |
| 2014/0229531 A1 | 8/2014 | Neel et al. |
| 2015/0089604 A1* | 3/2015 | Mathew ............. H04L 65/1069 726/5 |
| 2015/0172390 A1 | 6/2015 | Colrain et al. |
| 2015/0326673 A1 | 11/2015 | Neel et al. |
| 2016/0179420 A1* | 6/2016 | Mei ...................... G06F 3/0619 711/162 |
| 2016/0321304 A9 | 11/2016 | Colrain et al. |
| 2017/0076342 A1* | 3/2017 | Golec ................... G06Q 30/04 |
| 2017/0212691 A1* | 7/2017 | Katsuki ................ G06F 3/0619 |
| 2017/0339176 A1* | 11/2017 | Backer ................. H04L 67/22 |
| 2018/0129688 A1 | 5/2018 | Colrain |

FOREIGN PATENT DOCUMENTS

| | | |
|---|---|---|
| EP | 1170662 A2 | 1/2002 |
| EP | 1610238 A2 | 12/2005 |
| WO | WO02/05116 A2 | 1/2002 |
| WO | WO02/07037 A | 1/2002 |
| WO | WO02/097664 A1 | 12/2002 |
| WO | WO02/097676 A2 | 12/2002 |
| WO | WO03/005202 A1 | 1/2003 |
| WO | WO03/009139 A1 | 1/2003 |
| WO | WO03/014928 A2 | 2/2003 |
| WO | WO 03/014929 A1 | 2/2003 |
| WO | WO03/062983 A2 | 7/2003 |
| WO | WO2008/051855 | 5/2008 |

OTHER PUBLICATIONS

Kokku, Ravi et al., "Half-Pipe Anchoring: An Efficient Technique for Multiple Connection Handoff," Proceedings of the 10th International Conference of Network Protocols, Nov. 12, 2002, 10 pages.

Jeffrey S. Chase et al., "Dynamic Virtual Clusters in a Grid Site Manager", Jun. 22, 2003, 11 pages.

Henry Song, et al., "Browser State Repository Service," Lecture Notes in Computer Science, vol. 2414, 2002, pp. 1-14.

Galanis et al., "Oracle Database Replay", ACM dated 2008, pp. 1159-1170.

Eric Skow, et al., "A Security Architecture for Application Session Handoff," 2002 IEEE International Conference Proceedings, Apr. 28-May 2, 2002, vol. 1of 5, pp. 2058-2063.

Dias, K., et al., "Automatic Performance Diagnosis and Tuning in Oracle", XP-002470748, CIDR Conference, 2005, 12 pages.

Colle et al., "Oracle Database Replay", ACM, dated 2009, 4 pages.

"Webopedia Definition and Links" 1996 definition of "server" available at: http://web.archive.org/web/20010411032957/http://www.webopedia.com/TERM/s/server.html (3 pages).

"TechWeb Network" 2003 definition of "client": available at: http://www.techweb.com/encyclopedia/printView?term=client&view=print (5 pages).

"Database Replay", Oracle White Paper, dated 2007, 19 pages.

"6 Application Builder Concepts" downloaded from the Internet Apr. 12, 2007 < http://oracle-docs.dartmouth.edu/dba-docs/10gdoc/appdev.101/b10992/mvl_fund.htm > p. 11.

"5 Schema Objects", downloaded from the Internet Apr. 12, 2007 < http://oracle-docs.dartmouth.edu/dba-docs/10gdoc/server.101/b10743/schema.htm > pp. 11-14.

"28 Transparent Application Failover", Oracle® Database JDBC Developer's Guide and Reference 10g Release 2 (10.2) Part No. B14355-04 downloaded from the Internet on Jul. 25, 2011, dated 1999, 3pgs.

Colrain, U.S. Appl. No. 15/803,644, filed Nov. 3, 2017, Office Action, dated Mar. 9, 2020.

Colrain, U.S. Appl. No. 14/587,570, filed Dec. 31, 2014, Final Office Action, dated Oct. 19, 2017.

Papadomanolakis, U.S. Appl. No. 13/076,313, filed Mar. 30, 2011, Notice of Allowance, dated Oct. 19, 2012.

Kaluskar, U.S. Appl. No. 10/917,882, filed Aug. 12, 2004, Office Action, dated Feb. 20, 2009.

Kaluskar, U.S. Appl. No. 10/917,882, filed Aug. 12, 2004, Advisory Action, dated Nov. 12, 2009.

Kaluskar, U.S. Appl. No. 10/917,882, filed Aug. 12, 2004, Office Action, dated Apr. 15, 2008.

Kaluskar, U.S. Appl. No. 10/917,882, filed Aug. 12, 2004, Notice of Allowance, dated Feb. 8, 2010.

Cao, U.S. Appl. No. 11/732,844, filed Apr. 4, 2007, Notice of Allowance, dated Sep. 4, 2009.

Kaluskar, U.S. Appl. No. 10/917,882, filed Aug. 12, 2004, Final Office Action, dated Oct. 16, 2008.

U.S. Appl. No. 13/542,278, filed Jul. 5, 2012, Notice of Allowance, dated Jun. 15, 2016.

Colrain, U.S. Appl. No. 14/587,570, filed Dec. 31, 2014, Office Action, dated Jun. 14, 2018.

Colrain, U.S. Appl. No. 14/587,570, filed Dec. 31, 2014, Interview Summary, dated Jan. 12, 2018.

Colrain, U.S. Appl. No. 14/587,570, filed Dec. 31, 2014, Advisory Action, dated Feb. 2, 2018.

Colrain, U.S. Appl. No. 13/936,061, filed Jul. 5, 2013, Notice of Allowance, dated May 17, 2017.

Colrain, U.S. Appl. No. 13/542,278, filed Jul. 5, 2012, Office Action, dated Nov. 23, 2012.

Cao, U.S. Appl. No. 11/732,844, filed Apr. 4, 2007, Office Action, dated Jun. 1, 2009.

Kaluskar, U.S. Appl. No. 10/917,882, filed Aug. 12, 2004, Final Office Action, dated Sep. 10, 2009.

U.S. Appl. No. 13/936,061, filed Jul. 5, 2013, Final Office Action, dated Aug. 8, 2014.

U.S. Appl. No. 13/542,278, filed Jul. 5, 2012, Examiner's Answer, dated Jan. 29, 2014.

U.S. Appl. No. 13/542,278, filed Jul. 5, 2012, Final Office Action, dated May 2, 2013.

U.S. Appl. No. 14/748,451, filed Jun. 24, 2015, Office Action, dated May 16, 2016.

U.S. Appl. No. 14/748,451, filed Jun. 24, 2015, Notice of Allowance, dated Nov. 1, 2016.

(56) References Cited

OTHER PUBLICATIONS

U.S. Appl. No. 14/587,570, filed Dec. 31, 2014, Office Action, dated Mar. 13, 2017.
U.S. Appl. No. 13/936,061, filed Jul. 5, 2013, Office Action, dated Dec. 12, 2014.
Papadomanolakis, U.S. Appl. No. 13/076,313, filed Mar. 30, 2011, Office Action, dated Jun. 5, 2012.
U.S. Appl. No. 13/936,061, filed Jul. 5, 2013, Office Action, dated Jan. 10, 2017.
U.S. Appl. No. 12/562,984, filed Sep. 18, 2009, Notice of Allowance, dated Apr. 15, 2014.
U.S. Appl. No. 13/936,061, filed Jul. 5, 2013, Final Office Action, dated May 28, 2015.
U.S. Appl. No. 13/936,061, filed Jul. 5, 2013, Advisory Action, dated Sep. 4, 2015.
U.S. Appl. No. 13/936,061, filed Jul. 5, 2013, Office Action, dated Mar. 25, 2014.
U.S. Appl. No. 13/542,278, filed Jul. 5, 2012, Office Action, dated Nov. 23, 2012.
U.S. Appl. No. 13/542,278, filed Jul. 5, 2012, Notice of Allowance, dated Nov. 4, 2016.
U.S. Appl. No. 10/917,882, filed Aug. 12, 2004, Office Action, dated Aug. 14, 2009.
U.S. Appl. No. 13/936,061, filed Jul. 5, 2013, Office Action, dated Jun. 2, 2016.

\* cited by examiner

SESSION TEMPLATES

BENEFIT CLAIM

This application claims the benefit under 35 U.S.C. § 119(e) of provisional application 62/566,253, filed Sep. 29, 2017, the entire contents of which is hereby incorporated by reference for all purposes as if fully set forth herein.

RELATED APPLICATIONS

This application is related to application Ser. No. 15/803,644, entitled "Safe Release of Database Sessions for Planned Maintenance Operations," filed on Nov. 3, 2017, the entire contents of which are hereby incorporated by reference.

This application is also related to (1) U.S. Pat. No. 9,600,371, entitled "Preserving Server-Client Session Context," filed Jul. 5, 2012, the entire contents of which is incorporated by reference as if fully set forth herein; (2) U.S. Pat. No. 8,924,346, entitled "Idempotence For Database Transactions," filed Apr. 16, 2012, the entire contents of which is incorporated by reference as if fully set forth herein; (3) U.S. Pat. No. 8,984,170, entitled "Idempotence For Database Transactions," filed Apr. 16, 2012, the entire contents of which is incorporated by reference as if fully set forth herein; (4) U.S. Pat. No. 8,549,154, entitled "Recovering Stateful Read-Only Database Sessions," filed Sep. 9, 2011, the entire contents of which is hereby incorporated by reference as if fully set forth herein; (5) U.S. Pat. No. 8,725,882, entitled "Masking Database Outages From Clients And Applications," filed Jul. 31, 2012, the entire contents of which is hereby incorporated by reference as if fully set forth herein; (6) U.S. Pat. No. 9,124,670, entitled "Transactional And Non-Transactional Data For Maintaining Session State," filed Mar. 31, 2014, the entire contents of which is hereby incorporated by reference as if fully set forth herein; (7) U.S. Pat. No. 9,591,103, entitled "Transactional And Non-Transactional Data For Maintaining Session State," filed Jun. 24, 2015, the entire contents of which is hereby incorporated by reference as if fully set forth herein; (8) U.S. Pat. No. 7,747,754, entitled "Transparent Migration Of Stateless Sessions Across Servers," filed Aug. 12, 2004, the entire contents of which is incorporated by reference as if fully set forth herein; (9) U.S. Pat. No. 7,502,824, entitled "Database Shutdown With Session Migration," filed May 1, 2006, the entire contents of which is incorporated by reference as if fully set forth herein; (10) U.S. Pat. No. 7,552,218, entitled "Transparent Session Migration Across Servers," filed Aug. 12, 2004, the entire contents of which is incorporated by reference as if fully set forth herein; (11) U.S. Pat. No. 7,415,470, entitled "Capturing And Re-Creating The State Of A Queue When Migrating A Session," filed May 17, 2005, the entire contents of which is incorporated by reference as if fully set forth herein; (12) U.S. Pat. No. 7,634,512, entitled "Migrating Temporary Data Of A Session," filed Apr. 4, 2007, the entire contents of which is incorporated by reference as if fully set forth herein; and (13) U.S. Pat. No. 8,380,665, entitled "Application Workload Capture And Replay System," filed Mar. 30, 2011, the entire contents of which is incorporated by reference as if fully set forth herein.

BACKGROUND

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The ability to perform an automatic failover during a critical failure or planned maintenance of the database management system (DBMS) or a component thereof without having any control over client applications that are using the DBMS, is highly desirable. Especially when a client application is using a cloud-hosted DBMS, the client application may not be in control of the management of the DBMS, while the administrators of the cloud, who manage the DBMS, have no control over or knowledge about the client application. Indeed, in the cloud-based DBMS environment, a client application and DBMS-related services are completely abstracted from each other. The DBMS has lesser or no knowledge about or control over the client application and is managed by a cloud provider. And, a client-managed application similarly has lesser or no knowledge about or control over the DBMS it connects with.

Therefore, it is critical, when planned maintenance, load rebalancing or an interruption in the session of a client application with the DBMS, to find a safe place for the client application to seamlessly and automatically restart its work. Accordingly, planned maintenance, load rebalancing or an interruption in the session are examples of possible operations that require that database sessions are released without disrupting applications. The term "disconnection-requiring planned operation" (or simply "planned operation") refers to such an operation. A safe place is a point at which the session of a client application with a DBMS can be closed without an adverse effect to the application.

One approach is to track the transactions in the session. A client driver may track whether any request (that includes transactions, SQL, and non-SQL work) has been started by the application and track the receipt of directives from the DBMS when a request is started until it completes. The DBMS may assume that when a request is not in progress, the session is recoverable. However, the session, which has an in-flight request, may not transparently recover the in-flight work when a new session is established with a new database server or using a new service.

To transparently recover for the client application, it is necessary to rebuild the original session state at the interruption point in the new session so that the application can seamlessly continue to execute its work that was interrupted in the original session. This becomes a particularly complex problem when the state information of a session includes temporary tables and other temporary data structures, on which the client application work in the session relies.

Nevertheless, after detecting an interruption with the original session, a new session may then be opened with the DBMS. The DBMS can redirect the request to a database server/service that is not affected by the interruption. A new session that is opened as a recovery from the interrupted session at such a point would need to recover the session state of the previous state to succeed in a seamless continuation of the client application's work.

One approach to do so is for the DBMS to send directives to the client driver that is using the session to capture (or ignore) the commands that have been sent through the original session. However, for the captured command to be replayed and produce the same results as in the original session, the execution environment, session state, of the command has to be the same in the new session.

This a complex problem because various aspects of the session state are created by various components of DBMS executing various functions for processing the command and thus, affecting the execution environment for the same or next command to be executed. New techniques are needed to distinguish between the various aspects and their effect on the restorability of the session state on the new session.

Furthermore, even if the state is exactly restored in the new session, the DBMS may still need client input for determining which commands can be replayed and which commands can or should be ignored. For example, if a command includes sending an email or another external action, the client driver has to be notified of such logic to ignore the command from being recorded for the purposes of replay. Otherwise, the external action may be performed twice, which would have unintended consequences (e.g., sending an email twice) and will be an error for the client application.

Requiring a client application to determine how to recover a session state is a requirement for the client application to be involved in infrastructure management. That is not the area of the expertise that the developers of client application are generally well-versed, and thus doing so may be burdensome and error-prone, and does not scale. To transparently recover the state of the session in case of planned maintenance, load imbalance, or unplanned outage, the recovery should be performed with minimal or no client application intervention.

Additionally, a session state at a point in a lifecycle of a session may include hundreds if not thousands of attributes describing these various aspects of the execution environment of the session. Each of the values of such attributes may change during the lifecycle of the session, thus changing the actual session state. Maintaining thousands of permutations of thousands of attributes for a lifecycle of a single session may require enormous amounts of fast access memory on a database server or on a client computing system. There may be hundreds of concurrent sessions making memory management of session state information particularly problematic. Additionally, the state information may need to be transferred between database servers and/or client computing system. Doing so, would put a burden on the network and add to the latency of query executions.

BRIEF DESCRIPTION OF THE DRAWINGS

In the drawings of certain embodiments in which like reference numerals refer to corresponding parts throughout the figures.

DETAILED DESCRIPTION

Figure 1:
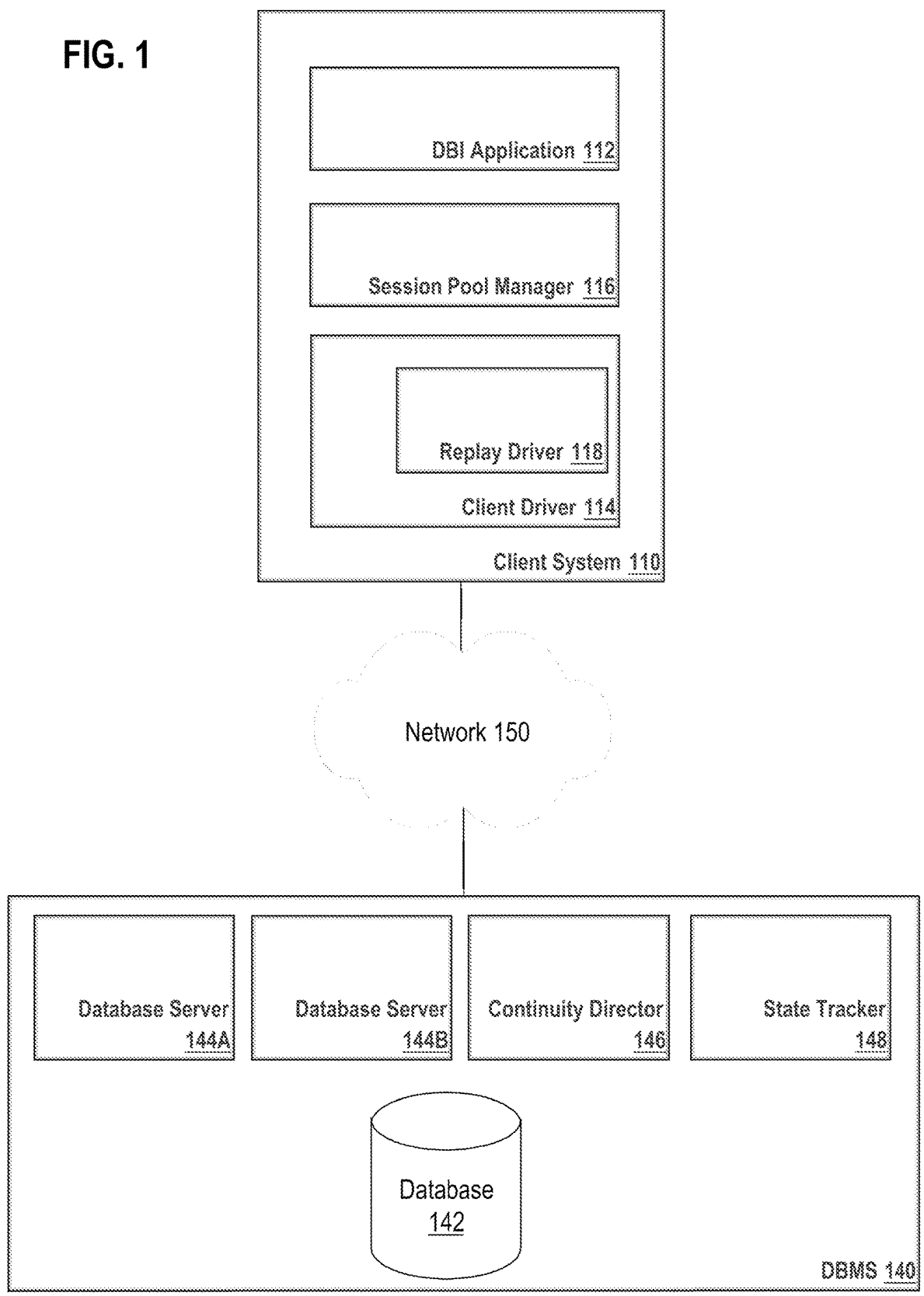
FIG. 1 is a block diagram that depicts a DBMS and a client computer system hosting DBI application interfacing with the DBMS, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

Introduction: Applications and Logical Connections

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A client driver for a database interfacing (DBI) application maintains a connection pool, which includes connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to DBI applications for processing requests. As work completes, connections are returned to the connection pool and are available for subsequent DBI applications to borrow from the pool.

A DBI application is any logic running on one or more computing devices that uses a database connection to retrieve information from the database. The retrieved information may be presented or displayed to a user of the application or send to a client application. For example, the DBI application may be accessed from a browser, where the DBI application receives input from the user and presents information to the user. The DBI application may be an application that is accessed through a web portal, over a network, by the user, an application that is installed on a machine of the user, or an application that is distributed among multiple machines.

In one example, a DBI application issues a request to a DBMS for data from a database. The request may or may not be sent in response to user input. The DBI application selects a free connection from amongst the freed connections in the pool to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The DBI application sends the client request on the selected connection to a database instance, and the database instance accesses a database to handle the request. The database server processes the request by retrieving or modifying data in the database or by retrieving or modifying the data in a cache of data from the database. The database server establishes a state for the database session as the database server processes the request.

DBI applications may be categorized into different classes based on their session state management—stateless, pre-set state and heavy-state applications. When a stateless application obtains a connection from the pool, the stateless application doesn't apply any initial state to the established session and has no expectations of a preserved state when the connection is returned to the pool.

A pre-set state DBI application may apply an initial state to a newly formed session over an obtained connection. However, the state change to the session due to the execution of commands over the session can be reset without adverse effect to the DBI application.

The third type of DBI applications is heavy-state applications. A heavy-state application relies on the state of the session to correctly and successfully execute commands over the database session. If the session state is not correctly rebuilt, then an error or wrong response may be generated for the DBI application.

For example, many of mid-tier servers are heavy-state applications that provide database instance connections to client applications that request information from a database. A mid-tier server is a server that provides access to one or more database servers, distributes work to one or more database servers, or manages connections to one or more database servers. In one example, an Oracle® Fusion® Application is specially configured to retrieve data from an Oracle® database and display the information to a user of the Fusion® Application.

Although DBI applications rely on the states of database sessions to different degrees, neither a client driver nor a database server may be able to determine as to which type of DBI application has established a database session with a database. Accordingly, if the client driver or the database server has a limited ability to recover the state of a database session for the applications, neither can presume that it is a stateless application and the state can be recovered, or it is a heavy-state application, and no state can be recovered. To address this shortcoming in the recovery, load-balancing and planned maintenance technology of database management system, techniques are described herein that can rebuild the state of a database session in a transparent way reducing any downtime and enabling the transition of database sessions from one database server to another.

Introduction: Effect of Database Session Unavailability on the Application

The state of a database session varies during the lifecycle of the session. The variation is caused by a DBI application using the database session to access a database and various commands being executed by various DBMS components that affect the database session state. For example, a DBI application uses the database session to execute commands to obtain locks, create temporary variables or database objects, establish user-specific information, establish application-specific information, establish cursor information, create temporary arrangements or selections of data, and/or perform other partially completed operations on data for further processing in the database session. If the database session fails before the further processing occurs, the locks, temporary variables or database objects, user-specific information, application-specific information, cursor information, temporary arrangements or selections of data, and/or the partially completed operations become unavailable to the application, even if the application attempts to reference this information in a new database session.

In one example, the database session may fail or otherwise becomes unavailable if a database instance upon which the database session depends fails or otherwise becomes unavailable. In most cases, failure of the database session causes the DBI application to fail as the in-progress database session is lost. The DBI application's user must restart the DBI application or components of the DBI application and start over with logging in, opening cursors and retrieving data, obtaining locks, creating temporary variables or database objects, establishing user-specific information, establishing application-specific information, establishing cursor information, creating temporary arrangements or selections of data, and/or partially completing operations on data for further processing in the database session. In one example, upon failure of the database session, the user may be left hanging with a blue screen or interrupted with an error message.

In prior client-server systems, if there is a break between the client and the server, the client sees an error message indicating that the communication failed. This error does not inform the client whether the submission executed any commit operations or if a procedural call, ran to completion executing all expected commits and session state changes or failed part way through or yet worse, is still running disconnected from the client.

If the client wanted to know whether the submission to the database was committed, the client could have added custom exception code to query the outcome for every possible commit point in the application. Given that a system can fail anywhere, this is impractical in general as the query must be specific to each submission. After an application is built and is in production, this is completely impractical. Moreover, a query cannot give an accurate answer because the transaction could commit immediately after that query executed. Indeed, following a communication failure, the server may still be running the submission not yet aware that the client has disconnected.

For queries with an external operation, an operation that goes beyond operations on database objects such as PL/SQL or Java operations, or other such procedures submitted to the database, there is no record as to whether the procedural submission ran to completion or was aborted part way through. While it may have committed, subsequent work may not have been done for that procedure.

Failing to recognize that the last submission has committed or shall commit sometime soon or has not run to completion can lead to duplicate transaction submissions and other forms of "logical corruption" as users and software might try to re-issue already persisted changes.

Existing technologies do not provide information about the work that was being executed by the resource when the resource became unavailable. For example, the application is not aware of the outcome of the last operation being processed by the resource in case of outages, planned or unplanned. If a server goes down while executing a set of commands, and before the server sends a response to a client for the set of commands, the client is unaware of whether the set of commands was executed by the server before the outage. Even highly complex applications may expose outages to the end users.

Users experiencing resource outages may be frustrated and may lose revenue due to missed business opportunities, decisions made using bad data, troubleshooting expenses, and lost time in restarting the application or redoing the work. Some applications warn the user not to hit the submit button twice, and, when not the warning is not heeded by users, duplicate transactions may be created if both submissions are allowed to complete.

In another example, once the database session has failed, the user may be prevented from entering any information or causing any commands to be submitted to the database before the page is reloaded. Also, reloading the page without checking what data was stored in the database could lead to a duplicate submission. The application may prevent the user from submitting any commands that depend on the state that was lost in the failed database session or may misbehave if the needed information is no longer available. In a particular example, fields already presented to the user may be grayed to indicate that, in order to avoid corrupting data stored in the database, the fields can no longer be modified by the application.

Even if the database session fails over to a second database instance, the second database instance may not have any information about the database session beyond what was committed to the database prior to the failure. In order to avoid corrupting the data in the database, applications may reset the information that is displayed to the user to information that matches the data already committed to the database. In other words, when a database instance fails, a user may lose temporary information that would have been available to the user just prior to the failure. Some of the lost information may correspond to information that was being displayed, modified, selected, or arranged by the application and/or user that was using a now unavailable database session, or information that was about to be returned to the application and/or user on the now unavailable database session. The user is often forced to re-enter fields of data again.

The loss of information already entered, modified, selected, and/or arranged by a user may result in user frustration, and wasted time in re-entry, re-modification, re-selection, and/or re-arrangement of the information after the application or application component has restarted. The lost information may be information that was retrieved by the user from others, for example, by video, voice, email, or text message. In some cases, the lost information may no longer be retrievable. Losing information can be particularly costly when the user is being assisted by a support service provider as the failure occurs. Loss of information may require further communications with the support service provider, or may even cause the user to lose faith in the reliability of the application, the mid-tier server, or the database server, or the company that provides the application, the mid-tier server, and/or the database server. Further, the user may be selecting, entering, or modifying time-sensitive information prior to failure. Requiring the user to re-enter the time-sensitive information after the failure may result in a delay that causes loss of business, value, or reputation of the user to business clients or business ventures of the user. Requiring re-entry may also result in a loss of opportunity for the user. For example, the user may miss out on items or opportunities that the user had previously selected.

Introduction: Fast Application Notification

DBI application developers develop applications that deal with reported outages of the underlying software, hardware, underlying communication layers, or other resources in a server-client system. For example, since Oracle 10g, Fast Application Notification ("FAN") delivers notifications to applications when a resource comes up (i.e., becomes available) or goes down (i.e., becomes unavailable), and application developers may customize their applications to change application behavior in response to the notifications.

General Overview

Techniques are disclosed herein for identifying, recording and restoring the state of a database session and various aspects thereof. The database session state that was built up on a first database session between a first database server and a client may be automatically restored to a second database session between a second database server and the client. To restore the database session state, the system maintains one or more attributes of a database session state that describe various aspects of the state and affect the execution of the commands in the session.

"Session template" term refers herein to a set of session attributes values at a point in a lifecycle of a database session. Each session attribute describes a particular aspect of a session state that affects the execution environment for commands. The value of the session attribute may change at different points of the session lifecycle, thus representing the corresponding aspect of the session state at that point. A session template is immutable as it partially (or in some embodiments, wholly) represents a snapshot of a session state at a particular point of the lifecycle of the database session.

A session template may implicitly or explicitly include attribute names in addition to the corresponding attribute values. Session template implicitly includes attribute names when the session template is configured to include a particular set of session attributes in a particular arrangement. The particular values placement within the arrangement may indicate the particular values corresponding session attribute. The term "attribute-value pair" refers herein to a data structure that includes session attribute value and the corresponding attribute name or an indication thereof.

In an embodiment, a template identifier is generated for a session template. Each unique template identifier identifies a unique set of session attribute value-pairs. Thus, if the session template identifiers of two session templates are identical, then the corresponding session templates contain exactly the same set of session attribute-value pairs. Accordingly, a template identifier, at least in part, represents a unique session state.

To significantly save memory space, a session template may be stored in memory only once, even if a corresponding session state is encountered in multiple sessions or multiple times during a session, in an embodiment. For example, if two database sessions have encountered the same session state that is to be stored, rather than storing twice the same session attribute-value pairs, the system stores the set of attribute-value pairs only once. The system generates a template identifier for the stored session template and uses the template identifier for both sessions. When another session state yields the same set of attribute-value pairs, the attribute value pairs are not redundantly stored in the database; rather an association is generated between the existing template identifier and the new session state.

Additionally, the template identifier may be a signature based on the set of session attributes and values in the session template. The system may determine whether a session template for a session state has already been stored based on generating a template identifier from the set of session attributes and values. The system saves significant computer processing resources by avoiding a costly comparison of a set of session attributes and attribute values of a session state with already stored ones each time a state of a session is to be stored. Rather, the system generates a template identifier of a set of session attributes and values for a current session state and then compares the template identifier with the existing template identifiers associated with the already stored session templates.

In an embodiment, the system may save a particular session state using multiple session templates. In such an embodiment, the session template may have a hierarchy based on the perceived frequency of encountering different attribute value for a session attribute in different session states. For example, less frequently-changed session attributes may be grouped into a lower-level session template, and more frequently-changed session attributes may be grouped into a higher-level session template. Using such a hierarchy saves significant storage resources because it removes the need to re-store less-frequently changed attributes and their values for session templates in which only higher-level attribute values are the ones that are different.

In a related embodiment, to further improve storage, the most frequently changing session attributes are excluded from a session template. Thus, to compare session states, not only session template identifiers are used, but additionally, the excluded attributes and their values are also compared.

Thus, in such an embodiment, session template(s) store only a portion of a session state information, and in some embodiment, session templates may not be used at all. Session state information may be represented with individual attribute-value pairs or as opaque/transaction objects. Such aspects of a session state such as authentication, authorization, and other security information, application-specific information, various environmental settings, and memory space management aspects may be tracked without generating/referencing session templates.

Techniques are described herein to automatically and transparently restore and verify a session state, regardless of the techniques used to record and maintain an aspect of the session state. To do so, a DBMS may be configured to classify aspects of session state based on whether an aspect can be restored based if requested. An aspect may be further classified based on which actor maintains the session state information for the aspect. Non-limiting example classifications are:

a) client restorable—a client system of a DBMS maintains information about an aspect of session state and is able to restore the aspect if necessary. For example, during a replay, the client system may issue commands to the new database server to restore the session state based on the stored information. For example, a replay driver may store an aspect of session state in the form of "ALTER SESSION" statement(s) in the replay context. When the commands in the replay context are replayed to a new database server, the "ALTER SESSION" statement(s) are also issued to the new databases server to restore the aspect of session state. Alternatively or additionally, client restorable attributes are included in one or more templates stored on the DBMS which may restore them upon request.

b) server restorable—a system maintains information about an aspect of session state. During a replay, the new database server may restore the aspect of session state based on the stored information. The DBMS may store attribute-value pairs or session template(s) representing the aspect in the DBMS managed database.

c) non-restorable—an aspect of session state for which is not restorable. The information about the aspect may be maintained on a DBMS and/or on a client system.

In an embodiment, after capturing one or more aspects of a session state at a particular point in a life cycle of the session, a summary of the session state is generated. The term "session state summary" refers herein to a data structure that includes a collective representation of multiple aspects of session state. A session state summary may itself include multiple session state summaries, each such included session state summary describing a different set of aspects of the session state.

In an embodiment, a session state summary contains an indication whether a modified state exists for any aspect of session state. The term "modified state" refers herein to any session aspect's state that has been changed due to the execution of client requested commands. The session state summary for a class of aspects of session state may contain an indication whether a change of state has occurred to any of the aspects of the class. For example, the session state summary for non-restorable aspects may contain an indication whether any non-restorable aspect has a modified state.

In an embodiment, the session state summary includes a state signature representing the captured state. The "state signature" refers to a data representation of the state(s) from multiple aspects of a session. The state signature may be a hash-based signature of one or more session template identifiers, individual attribute values or representations thereof.

Any point of a session state lifecycle, for which a session state summary is generated, may be used as a verification point. The term "verification point" refers herein to a point in a session lifecycle for which the session state has been at least partially captured. During a replay, the captured session state at a verification point may be used to verify that replay execution of (transactional and non-transactional) commands has resulted in the same session state, at least as much of the state as represented by the verification point. For example, a session state summary that was generated at a round trip of a transactional command may include an indication that a particular session state attribute has a modified state and the new value. As the commands are replayed, after the same transactional command's roundtrip, the Application Continuity determines whether the same modified state to the same session aspect has occurred and/or whether the changed value is the same as in the session state summary for the verification point. If so, verification succeeds, if not the client application that caused the execution is provided with an error.

A DBMS and/or a client driver may generate a verification point at an arbitrary interval. In one embodiment, the DBMS captures the session state of a session with a client system at each roundtrip. Before the DBMS returns status data for the client driver requested command execution, the DBMS may request capturing the session state as a session state summary, thus generating a verification point. The session state summary for the verification point may be returned to the client driver for storage.

Any verification point may also qualify as a safe point. The term "safe point" (or "safe place") refers herein to a session state that is known and restorable, and no transactional object is allocated (no cursor is open, no transaction is open, no reference cursor exists, no temporary large object (LOB) locator is allocated). At a safe point the Application Continuity may purge all queues, and if capture is disabled, re-enable for a future replay (e.g., using driver statement cache). A safe place is also where the Application Continuity initiates the capture of future states and, then, if needed, recovers to one of those states, if qualified as a safe point.

An initial safe point for a session is established at the initiation of the session by a client system with a DBMS. When a client driver requests a session from a session pool to establish a new session with the DBMS.

In some embodiments, the initial safe point may be established explicitly by a client application. The application may invoke a special interface of the client driver to indicate that the application is entering an application state which is independent of any previous states. For example, the application may invoke a request boundary interface to indicate to client driver that the subsequent commands are not relying on the previously sent commands if any. Similarly, an application may invoke the request boundary interface to indicate that no subsequent database command from the application is going to be dependent on the previous database command(s). Because of no dependence between previous and future database commands and thus non-reliance on a previous session state, such points at a lifecycle of the session are examples of safe points.

In an embodiment, a session state summary captured at an initial safe point may be used to determine if the session state has been properly initialized. Based on the existence and/or values for certain session aspects, it may be determined that the session state has not been properly cleaned from a borrowed session. Thus, an error may be reported to the application. In another embodiment, one or more session state summaries captured at verification points may be compared to the session state summary for the initial safe point to determine the same and based on the determination, report to the client system.

System Overview

FIG. 1 is a block diagram that depicts a DBMS and a client computer system hosting DBI application interfacing with the DBMS, in one or more embodiments. Client system 110 is connected to database servers 144A-B of DBMS 140 through network 150. Network 150 broadly represents a digital data telecommunications network comprising a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network or a combination thereof. Although a single client system 110A is depicted, other embodiments may include more client systems. Similarly, other embodiments may include more or fewer database servers 144A-B and database 142.

In an embodiment, DBI application 112 is an application server, a mid-tier database application, and/or any other database-backed application that executes on computing devices of client system 110.

In an embodiment, DBI applications may interface with a DBMS using a Client-Driver on the client system. For example, client system 110 includes DBI application 112 that interfaces with DBMS 140 using Client-Driver 114. Client-Driver 114, in this example, may utilize session pool manager 116 for connection with DBMS 140. Client-Driver 114 may interface with network interfaces of client system 110 to establish a connection with DBMS 140. Client-Driver 114 may communicate with DBMS 140 using database native calls. Session pool manager 116 and/or DBI application 112 may communicate with DBMS 140 by issuing driver-specific calls to Client Driver 114, which would translate the calls into native calls to DBMS 140 over one or more established connections. Although session pool manager 116 is depicted in FIG. 1 as being separate from Client Driver 114A, in other implementations, session pool manager 116 may be part of Client Driver 114. The techniques described herein similarly apply to session pool manager 116 whether or not session pool manager 116 is part of Client Driver 114 or separate from Client Driver 114.

In an embodiment, DBMS 140 may itself initiate a communication (notification) with the client driver 114 to cause a particular action to be performed by client system 110. For example, a disconnection-requiring planned operation may be initiated for database server 144A, and one or more services of database server 144A may be migrated to another instance of the same database 144B by DBMS 140 or to another database that can offer the same service. DBMS 140 may issue one or more database events regarding the planned operation to the connected database client drivers of client systems. Client-Driver 114 may receive and parse such an event. An example of such events is FAN events described in the section above.

Application Continuity System (Application Continuity) provides for session continuity of established sessions of a client system with a DBMS for planned and unplanned disconnection events. Application Continuity includes one or more components of the DBMS and the client system such as one or more components of DBMS 140 and client system 110.

Application Continuity

In one embodiment, the Application Continuity uses a protocol between client-driver 114 and DBMS 140 such that the database session states are rebuilt if the database session becomes unavailable. Replay driver 118, which in some embodiments may be part of client driver 114 and in some embodiments may be a separate component from client driver 114, may rebuild the database session states. In other embodiments, client driver 114 of the Application Continuity performs a complete or partial set of functionalities described herein for replay driver 118. Thus, any reference to replay driver 118 may be interpreted as a reference to client driver 114.

When the database session becomes unavailable, is relocated, or becomes unresponsive, replay driver 118, in collaboration with DBMS 140, attempt to rebuild the affected database sessions. States at DBI application 112 may have not failed, so the database sessions are rebuilt to where they were before the failure, optionally, validating that client-visible results of the application recovery match the pre-outage results as replay progresses and at replay completion.

In an embodiment, DBMS 140 manages continuity of database sessions so that the database sessions remain uninterrupted even during an outage of a server instance that served the session. During runtime, a database server of DBMS 140, such as database server 144A, sends a replay context and LTXIDs (Logical Transaction Identifier) to client driver 114, and the client driver holds the LTXIDs, and the replay context in case replay is needed. If replay is needed, under the direction of DBMS 140, client driver 114 resubmits each command. DBMS 140 uses the LTXID to determine if the last request committed, and, if it did not, blocks it from doing so. DBMS 140 uses the replay context first to validate the security, database, protocol, and execution environment at the second session. After replay, DBMS 140 uses the replay context to check that the user-visible results are the same (semantically correct) as those from the original execution and that the execution environment has been rebuilt correctly. Replay progresses with the new server, such as database server 144B, validating the fidelity of each replay using the replay context. This process allows replay driver 118 and database server 144B to collaborate in restoring the execution environment on a second session if database server 144A becomes unavailable. The replay may be repeated on a third or fourth session continuing until the replay succeeds. If replay succeeds, the process returns to capturing the request again. If replay is not possible, the original error is returned to DBI application 112 together with the known outcome committed or not.

In an embodiment, state tracker 148 is a component of DBMS 140, which tracks and maintains the state of sessions of DBMS 140 with any client system including client system 110. In an embodiment, at each round trip from client system 110, state tracker 148 is notified about the changes to the session state. At the end of the round trip, state tracker 148 requests information about modified aspects of the session state and the new values thereof, if possible.

In an embodiment, state tracker 148 includes callbacks to other components of DBMS 140. When a component is invoked to perform one or more commands initiated through the session, the component of DBMS 140 communicates with state tracker 148 that a state of the session has been changed by the commands. At the end of the client request, before returning a status to a client, state tracker 148 performs a call back (invokes) the component to determine the state of the session. The state of the session may be represented by a session attribute-value pair returned as part of the callback. In some embodiments, the returned session attribute-value pair may be stored in database 142 as part of the capture of the session to be available for other database server 144B during a future replay. For the same reason, in another embodiment, the returned session attribute value is sent to client system 110's replay driver 118 for storage as a replay context.

In an embodiment, components of Application Continuity may work together to execute capture and replay. Replay driver 118 intercepts execution errors and, when these errors are recoverable, automatically replay the user calls from the beginning of the request. When successful, the replay appears to application 112 as a delayed database interaction. In collaboration with DBMS 140, replay driver 118 maintains a history of calls during a conversation between client driver 114 and DBMS 140. For each call made at runtime, driver 118 retains the context required for a subsequent replay.

Continuity Director 146, an example component of DBMS 140, directs the runtime and replay, collaborating with replay driver 118 as to what is to be maintained for the replay. Director 146 knows what is repeatable and how it should be repeated and applies this knowledge. For example, during runtime, director 146 may save protocol and validation information (and mutable sufficient for replaying) or direct the replay drivers to keep or purge calls. During replay, director 146 may reject a replay that:

Runs on a different database or a database that has lost transactions and potentially diverged Violates protocols, and/or Fails to reproduce the same client-visible data (rows, out binds, error codes, and messages) that the application or client saw and potentially made decisions on during the original execution In an embodiment, the replay context is opaque information that DBMS 140 returns to the client driver during normal application run time. The replay drivers save the context with each SQL or PL/SQL call that the drivers have been instructed to hold. The replay context contains sufficient knowledge to protect and validate replay of each call and to apply mutables when mutable values have been retained. When a call is no longer needed for replaying the session, the replay context is discarded along with the call itself.

Replay context may store session state information using session template(s). In one embodiment, session templates may be persistently stored in database 142 while replay context includes necessary template identifiers referencing the stored templates. Accordingly, when session information is transmitted from database server 144A to client 114 and from client 114 to database server 144B, only template identifiers are transmitted saving considerable network bandwidth as well as client system 110 storage. In another embodiment, session template(s) are stored in the replay context and are thus transmitted to client system 110. Client system 110 may store the received session templates for future replay and validation of the replay.

Replay Driver

In an embodiment, Replay Driver 118 maintains a history of calls during a client conversation with the database, as instructed by Continuity Director 146. Although described as a separate component, the functionality of replay driver 118 described herein may be in part or fully performed by client driver 114. Thus, any reference herein to replay driver 118 may be interpreted as a reference to client driver 114.

Replay driver 118 maintains queues of calls, and for each call at runtime keeps the Replay Context needed for a later replay. The replay duration is limited by releasing accumulated history at the end of the request (normally, check-in to a driver pool), when replay is explicitly disabled, and at identified end of requests. Replay Driver 118 records the call history for the duration of each request, purging closed calls for completed requests, and SELECT calls and completed transactions for applications that are identified not to change session state during a request, under the direction of Continuity Director 146. In another embodiment, the retained history is marked for release during a request, and releases occur at the end of the request or as needed by the garbage collector.

Techniques described herein improves the efficiency and re-playability of Replay Driver 118 by automatically identifying safe points beyond end requests to release and restart the replay. Following an outage of the session that is due to a loss of database service, planned or unplanned, the replay drivers rebuild the database session states based on session templates and/or other session-related information.

In an embodiment, replay driver 118 establishes a new session, so that there is no residual state, issues an optional callback allowing the application to re-establish initial state for that session (if the callback is registered), and then re-executes the saved call history accumulated during runtime. The replay of calls comes from driver queues and can be repeated chronologically or in a lazy fashion depending on how the application changes the database state. The replay is under the direction of Continuity Director 146. Each replayed call may be checked to ensure that it returns exactly the same client-visible state that was seen and potentially used by the application in its decision making at the original execution. Each replayed call may also be checked to determine whether the call passes pre-replay and post-replay checks at DBMS 140 in order for the replay to be accepted and finalized.

In an embodiment, at-most-once transaction execution is protected by a corresponding LTXID. Transactions are only resubmitted when the error is recoverable, and the outcome for the transaction is confirmed as not committed by the last LTXID that was in use. The LTXID on the session that has been replaced at replay is now the LTXID that is in effect for the request. If the new session fails, then the latest LTXID in use is that which is checked for "at-most-one execution." All others have been blocked by previous replay attempts.

In an embodiment, Continuity Director 146, using the information in the Replay context, rejects the replay if there is any mismatch in the outcome. This includes all data that is returned on the wire including out binds, DML returning, error codes and error messages. This rejection ensures that all data that the application potentially made decisions upon are re-established—namely, rows are returned in the same order as the original execution, that the outcomes—in out binds (e.g., DML returning and PL/SQL procedure and function results, error codes, and error messages) and row sets are the same as the original execution, and that SQL defines, in-binds, and execution environment are the same as the original execution. Any divergence results in the replay being aborted, and if in a transaction, that transaction is rolled back. The failed-over session and session state (apart from the transaction) are left as is, allowing the application to take its own recovery action. In one embodiment, the responsibility of validation is moved to the client side when the Replay Context is not available.

Example features provided below are integrated with Replay Driver 118 to support a correct replay with the acceptable cost to runtime performance.

Continuity Director

In one embodiment, Continuity Director 146 causes database servers 144A/B to direct the runtime and replay parts of the feature. The objective is for the database servers to collaborate with client-side replay driver 118 as to what to do. DBMS 140, having access to the information (such as session state changes, embedded and top-level commits, rollback, administrative calls, etc.), can direct replay driver 118 accordingly. In one embodiment, the logic for handling replayable patterns, for what replay driver 118 places in its queues, and when to purge, exists on database servers 144A/B. In other embodiments, the logic may be distributed among several components of DBMS 140 or may exist on an entirely different component of the database system. For example, replay drivers 118 notify Continuity Director 146 about a) request boundaries, b) when input streams cannot be rewound, and thus, replay is disabled, and c) when the application executes an explicit disable replay API.

In an embodiment, continuity director 146 is placed in the DBMS 140's call processing management layer. This allows a complete picture of calls into and out of DBMS 140 to replay driver 118.

Session Attributes

Session attributes correspond to session parameters and fields that affect/define an aspect of session state. There are session parameters that client system 110, itself, maintains in addition to DBMS 140. The term "client-restorable attribute" refers herein to a session attribute-value pair, which is maintained by a client system locally. Accordingly, client-restorable attributes are configured so that their respective current values are stored on client system 110. For example, client restorable attributes may be set by client-driver 114 when initiating a session from session pool manager 116 with DBMS 140.

In an embodiment, client-restorable attributes may be set or reset either by client system 110 or by DBMS 140 or both. Regardless of which component sets the value of a client-restorable attribute, client system 110 receives a notification of the new value and maintains the new value locally. Client-restorable attributes may describe session information about DBI application 112, client driver 114 and DBMS 140. Table 1 below provides non-limiting examples of client-restorable attributes:

TABLE 1

Example of client restorable attributes

| Name | Description |
| --- | --- |
| ACTION | Identifies the position in the module (application name) |
| LANGUAGE | The language and territory currently used. |
| NLS_CALENDAR | The current calendar of the current session. |
| NLS_DATE_FORMAT | The date format for the session. |
| NLS_SORT | Binary or linguistic sort basis. |

The term "server attribute" refers to a session attribute that is not maintained by a client system but only by the DBMS with which the client system has established the session. Although a server attribute is maintained by a DBMS, in some embodiments, a client system sets/resets a server attribute using "ALTER SESSION" command without maintaining the newly set value locally. Server attributes may also be modified by execution of database commands on the DBMS. Another set of server attributes may remain static (unmodified) throughout the session. Server attributes are further classified into server restorable attributes that can be restored by the DBMS based on a request from a client driver and non-restorable attributes which cannot be restored based on a request but may be restored by execution of the appropriate commands that affect the corresponding aspect of the session state.

TABLE 2

Example of server attributes

| Name | Description |
| --- | --- |
| AUTHENTICATED_IDENTITY | The identity used in authentication |
| AUTHENTICATION_DATA | Data being used to authenticate the login user |
| CURRENT_SCHEMA | Name of the default schema being used in the current schema. |
| DB_NAME | Name of the database |
| MODULE | The application name (module) |
| NETWORK_PROTOCOL | Network protocol being used for communication |
| INSTANCE | The database instance identification number of the current instance. |
| DBMS_LOB | Temporary large object(s) (LOBs). |
| TEMPORARY_TABLE | Temporary table(s). |

Figure 2:
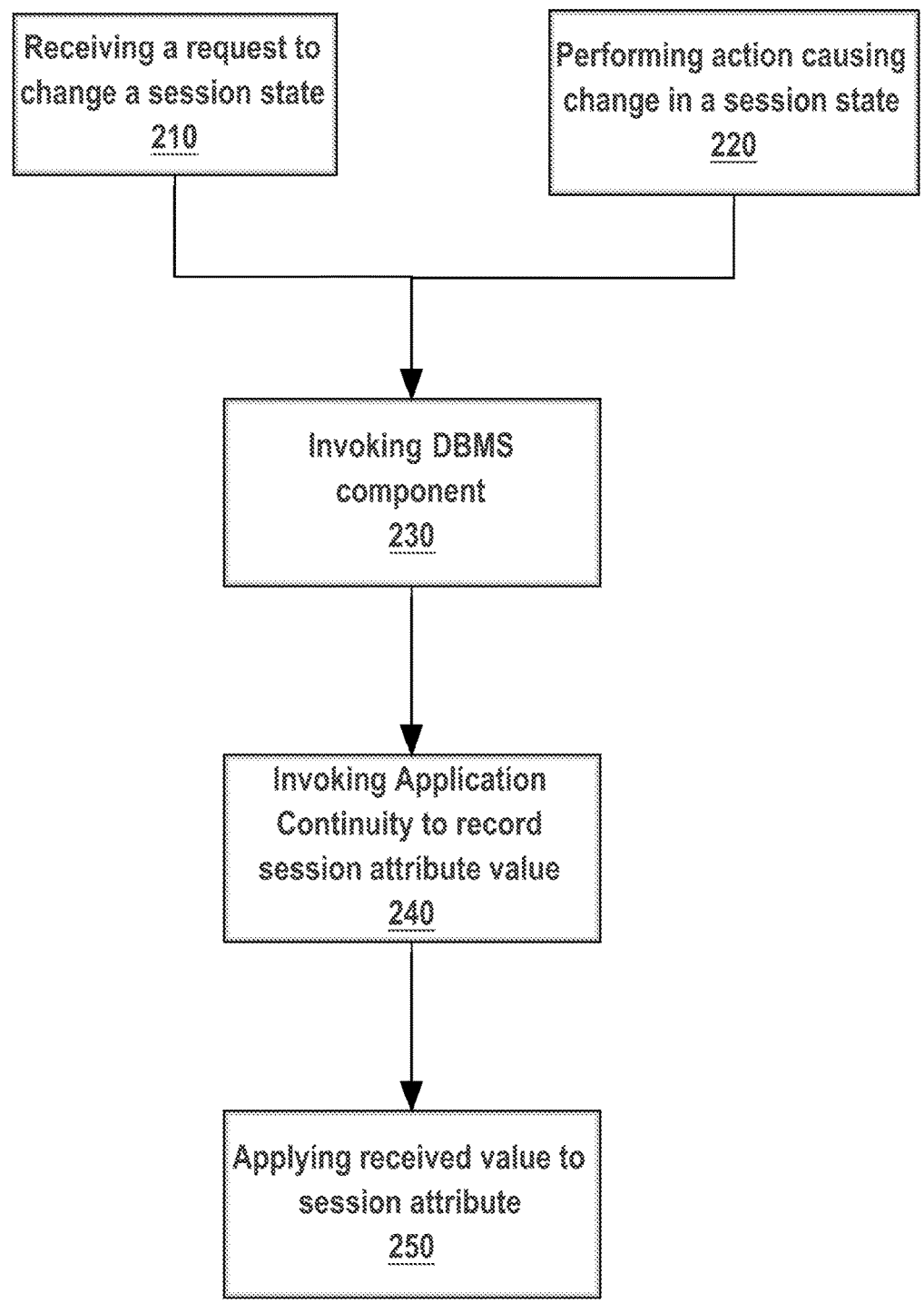
FIG. 2 is a flow diagram that depicts a process for modification of a session attribute, in an embodiment.

FIG. 2 is a flow diagram that depicts a process for modification of a session attribute, in an embodiment. Client-restorable and server session attributes may be set through declarative or procedural mechanisms. At step 210, DBMS 140 receives an explicit request to modify an aspect of session state. Such a request may be in the form of "ALTER SESSION" command over the session or by explicitly setting a session attribute on the session object representing the session by session pool manager 116. The session object may be synchronized or copied over from client driver 114 to DBMS 140's corresponding session object causing DBMS 140 to receive the request. Examples of attributes that are set by declarative mechanisms are LANGUAGE, MODULE, ACTION, NLS_DATE_FORMAT and so on.

Alternatively or additionally, at step 220, the performance of certain commands (such as PL/SQL procedures that populate global variables, LOB processing, and AQ processing) may cause modification of session attribute(s).

At step 230, DBMS 140 identifies and invokes the corresponding component that is tasked with maintaining the aspect of the session state for which the session attribute is modified. The component performs a call back into continuity director 146 at step 240, and at step 250, continuity director 146 applies the received value in the call back to the session attribute.

Session Templates

Commands executed in the context of a database session may continuously cause various aspects of the session state to change, and thus, the values of the corresponding session attributes may change as well to reflect the change in the session state. To save a partial or full snapshot of a session state, Application Continuity may generate a session template from values of session attributes.

There may be different types of session templates that include different types of session attribute-value pairs. Application Continuity may be configured to select which session attributes to include in which type of session template, in an embodiment. For example, the client-restorable attribute-value pairs that are sent from client system 110 to DBMS 140, may be used in a client-restorable typed template. For the client-restorable attributes, since the session attribute-value pairs are sent from client system 110 itself, the DBMS 140 is aware that the aspect of the session state that those session attributes represent is important for DBI Application 112, and thus is to be stored in a client-restorable session template.

In one embodiment, state tracker 148 monitors which client-restorable attributes' values have been modified during the lifecycle of a session and generate client-restorable session template(s) that include only those modified session attributes. A base template is maintained that includes default values for client-restorable attributes. The base template can be applied across multiple session and for any point in a lifecycle of a session. When any of those client restorable attributes are changed at a point in a lifecycle of the session, the Application Continuity generates a template that includes only for modified client-restorable attributes. The advantage of this approach of generating templates for only modified attributes is a reduction in a number of attribute-value pairs in client-restorable session templates and thus saving considerable storage space given the frequency and number of sessions that a DBMS handles.

Another type of session template is a server template that includes a number of server attribute-value pairs that are maintained only by a DBMS. The number of the server attributes, which are modified throughout the lifecycle of the session, is expected to be relatively small. While it is possible for different database servers to have different underlying values for the non-modified server session attributes, those attributes are not critical to the behavior of DBI application 112. Otherwise, client system 110 would behave differently depending on which database server the session was to be established. Accordingly, in an embodiment, the static server attributes are excluded from server templates to further save storage space.

Server templates and client-restorable templates together may describe a complete session state. Multiple session templates that have been generated and stored for the point in a lifecycle of the session may represent the relevant aspects of a session state at that point.

Session Template Hierarchy

Additionally or alternatively, a session state is described via a hierarchal set of session templates. In one embodiment, session attributes that are less likely to be modified throughout the lifecycle of the session are grouped at a different (lower) level session template(s) of the hierarchy. On the other hand, the more frequently modified session attributes (higher-level) are grouped into a higher level of session template(s). This way, session template(s) at a lower level maintain a constant (unmodified) set of attributes for longer periods of time than templates at a higher level. Thus, a new point in a lifecycle of a session may be described by generating a higher-level session template with frequently changing session attributes without generating a new session template(s) of a lower level in the hierarchy. In another embodiment, the levels in the hierarchy are reversed. Regardless which is considered a lower or higher level of session template, this technique improves storage efficiency of session templates by avoiding replication of non-modified session attributes as part of saving the session state for each point in the session lifecycle.

In a multilayer DBMS 140, different levels of template hierarchy correspond to session templates that describe attributes managed by DBMS 140 components at different layers. There may be multiple components that affect a session state. Those components may be layered hierarchically based on the sequence in which the components are invoked when a database request is processed. For example, DBMS 140 may contain the following layered components: multi-tenant container database management (CDB), pluggable database management (PDB), service, and session management. Each template of a layered component encompasses the session attributes of that layered component and thus, the state of a session set at that layer. In an embodiment, the higher layer of a component is associated with higher-level session template(s), which attribute values change more often. And similarly, lower level components, such as CDB/PDB, are associated with lower-level session template(s).

For example, a PDB session template encompasses the attribute-values pairs specific to the PDB aspect of session state, and a CDB session template encompasses the attribute-values pairs specific to the PDB aspect of session state. Client restorable, server restorable and non-restorable may be part each of the different component-based templates.

Another example of a hierarchical component session template is a service template. A service template includes session attributes whose values typically depend on a particular service used rather than the actual work performed by the service. Since the service attribute values are typically the same for all sessions of the service, having the service attributes as part of a separate template decreases the size of the session templates stored for session state(s). Accordingly, this technique increases the storage efficiency of the templates and provides for a concise application of a template to recreate the service aspect of the session state.

In a hierarchical and/or multi-type template embodiments, multiple session templates represent a particular point in a lifecycle of a session state, which is generated by state tracker 148.

Session Template Generation

Figure 3:
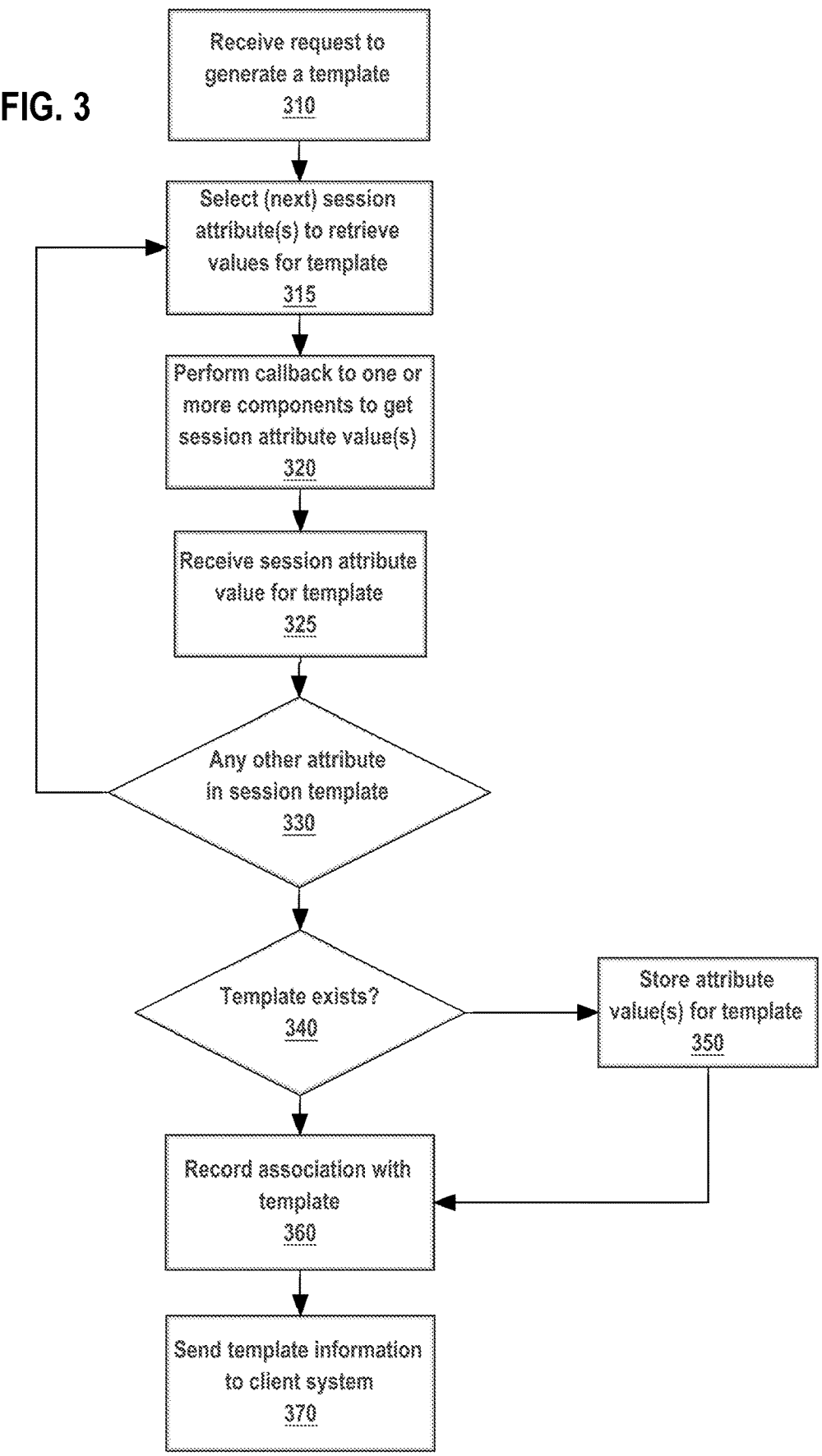
FIG. 3 is a flow diagram that depicts a process for generating a session template, in an embodiment.

FIG. 3 is a flow diagram that depicts a process for generating a session template, in an embodiment. At step 310, a request is received to generate a template. The request may be generated for capturing a session state at a point in a lifecycle of the session and/or based on a request received by client-driver 114. For example, each of the multiple-type session templates may be requested to be generated at the initiation of a session. Thus, any session would have a known initial session state represented by the one or more generated session templates.

Additionally or alternatively, the request for a generation of a template may be received when one or more attributes of the session template are detected to be modified. For example, a client call may include "ALTER SESSION" statements modifying various attribute-value pairs of session aspects. State tracker 148 may determine whether any of the sent attributes have changed and based on the determination, request the generation of one or more session templates of the affected session attributes. In another embodiment, state tracker 148 may assume that any client-restorable session attribute sent by client driver 114 indicates a change in the corresponding aspect and a new session template that includes the attribute is to be generated.

To generate a session template, at step 315, state tracker 148 identifies the session attributes that are part of the session template and iterates through the one or more identified session attributes.

At step 320, for a selected session attribute of the identified session attributes, state tracker 148 performs a callback (a programmatic request) to the DBMS 140 component that is associated with the selected session attribute to retrieve the attribute value, in an embodiment. At step 325, the component returns the attribute values. In one embodiment, if the change in the value of the selected session attribute is the one, which has caused the process for the generation of the session template, then state tracker 148 may use the available changed value instead of performing a call back for that particular session attribute.

At step 330, a determination is made whether any other attribute remains to be processed. If so, the process returns to step 315 to select the next session attribute. Otherwise, the process proceeds to step 340.

At step 340, state tracker 148 checks whether a session template with the same session attribute-value pairs exists. By performing the check, state tracker 148 avoids superfluously storing replicas of session templates. If a session template of the same session attribute-value pairs exists, then, at step 360, state tracker 148 records association between the already stored existing session template with the session's lifecycle point for which the session template was requested to be generated.

Storing Session Templates

At step 350, a session template may be stored in fast-access volatile memory in addition to or in place of storing the session template persistently on non-volatile memory such as disk storage. For example, CDB/PDB templates may be implicitly stored in non-volatile memory of DBMS 140 via the memory state of the PDB. The session-modifiable attributes (all client, server modified) contained in session templates are also persisted to disk storage within the PDB. This persistence is necessary for when DBI application 112 is moved from database server 144A to another database server 144B (such as failover). The CDB/PDB session state may be different on database server 144B but client system 110 has access to the common persistent storage to retrieve the templates for the session's original state. As another example, service attribute-based templates may not be persisted to the non-volatile memory as its access is not critical to rebuilding the session state.

Session templates are identified in the memory based on session template identifiers. In one embodiment, session templates are stored in a hash table data structure stored in the fast-access memory, and the hash values of the table uniquely identify the stored templates, in one embodiment. The template may be stored as an ordered list of attribute-value pairs. The order may be pre-configured for each attribute (each attribute may be assigned its corresponding placement in a template) or be based on attribute names (e.g., in ascending or descending order). The attribute-value pairs in the ordered list may be further optimized to improve storage efficiency. To do so, attribute value pairs and/or attribute names may be encoded (e.g., dictionary encoding) and stored in the hash table using the encoded name-values pairs to further improve storage efficiency of session templates.

Continuing with FIG. 3, in an embodiment in which the template identifier is based on the session attribute-value pairs of a session template, at step 340, the newly retrieved attribute value pairs for the generated session template are used to generate a session identifier for the session template. Since state tracker 148 uses the same techniques for generating of the session identifier for the newly created session template, session identifiers rather full session templates may be compared at step 340. For example, state tracker 148 arranges (and if necessary encodes) the newly retrieved session attribute-value pairs in the pre-configured order. The session template identifier is generated using the same hash-based algorithm.

The session template identifier, at step 340, is used as a lookup into the hash table to determine whether the same value session template identifier exists. If so, state tracker 148 already has stored the same session template into memory, and the process proceeds to step 360. If not, the session identifier is added to the hash table in association with the list of attribute-value pairs. The hash table improves the speed of matching new session templates with existing session templates.

In another embodiment, a session template identifier is independent of the session attribute-value pairs of the session template. In such an embodiment, to determine whether a replica of the generated session template is already stored, a separate signature is generated based on attribute-value pairs of the generated session template and compared with the similarly generated signatures of stored templates. Additionally or alternatively, each attribute and its value of the generated session template is compared with the previously stored session templates.

However, the fast-access memory, that stores the hash table and/or other data structure, is a limited computing resource in DBMS 140 or client system 110. Thus, to ensure the unlimited amount of fast-access memory is not used, session templates are eventually aged out. The aging may be based on a combination of a cache limit and a timeout. Even once aged out, a session template may be quickly rematerialized in fast-access memory from its persistently stored copy.

In an embodiment, session templates are stored on persistent storage of DBMS 140. Doing so makes the templates available to both database servers 144 A/B. The templates may be stored in database 142 as rows in a table. If the determination is made that the new template doesn't exist in the table at step 340, then the template is stored both in the persistent storage and materialized in fast access volatile memory at step 350. Each template will have a retention period based on the time of the last use, and old templates will eventually be purged from the table. If a purged template is later requested, an error will be returned to client driver 114.

Continuing with FIG. 3, after state tracker 148 stores a generated session template or identifies a pre-existing template for the retrieved session attribute-value pairs, state tracker 148 sends the template's identifier to client driver 114. Replay driver 118 maintains the template identifier in the replay context in association with the recorded commands requested over the session for which the template was generated. Accordingly, replay driver 118 maintains session state for the played commands, and the replay may be performed exactly in the same execution environment as the original command request.

Initiating Session State Capture

Using session templates or other data structures, the Application Continuity records and maintains the state of a session from its inception through its lifecycle. The initial session state is generated when DBI application 112 initiates a new session to execute one or more database commands, in an embodiment. In another embodiment, the initial state is generated when DBI application 112 invokes client driver 114's interface to indicate a request boundary in DBI application 112's lifecycle. Accordingly, whether through an interface or by establishing a new session, client driver 114 gets an explicit indication that a new initial session state is to be established with DBMS 140.

As part of the establishment, client driver 114 may be configured to initialize the state of the session. DBI application 112 may have registered callbacks for replay driver 118 to invoke to receive initial values for aspects of session state. For example, once the application-preferred language or time and date settings are received, client driver 114 may issue "ALTER SESSION" statements to initialize the language or time and date settings for the session. Replay driver 118 detects initialization of the session and identifies this point in a lifecycle of the session as an initial safe point for the session, in an embodiment. Replay driver 118 stores any initial session state setting commands in the replay context for the initial safe point. Replay driver 118 initiates a capture stage, in which any command sent over the session is recorded in the replay context.

In an embodiment, an initial state of a session is multiplexed when the session is checked out of the pool. The session pool may maintain sessions with preconfigured states. The pre-configured states may be represented by associated one or more templates and/or attribute-value pairs. Accordingly, in such an embodiment, the pre-configured state of a session in the pool is associated with a session state signature representing the initial state of the session.

The application 112 seeking a certain initial state, when checking out a session from the pool, provides a signature for the desired initial state at the checkout of a session from the pool. Rather than initializing such a state on any available session from the session pool, the session pool determines whether a session with a matching signature for the initial session state already exists in the session pool. If so, the session pool provides the identified session avoiding spending computer resources on the initialization of the session as described above.

In an embodiment, the initial state, at least in part, is stored in a session template and the session pool is pre-configured to apply the session template to one or more sessions in the session pool before checkout of the sessions from the pool. In such an embodiment, the pool is provided with a template identifier for the desired initial state and in response, provides a session with the corresponding template already applied and therefore, having the desired initial state.

In an embodiment, an explicit template may be used to apply an initial state to a session. The term "explicit templates" refers herein to a named template that is generated in response to a request a client application, such as client application 112. In an embodiment, DBMS 104 provides user controls to a database administrator to generate and configure an explicit template. Client application 112 may request for the generated explicit template to be used when for initializing an initial state on a session from a session pool. Doing so, client application 112 avoids issuing "ALTER SESSION" and more cumbersome and computer resource intensive callbacks to execute queries to complete the initialization.

Figure 4:
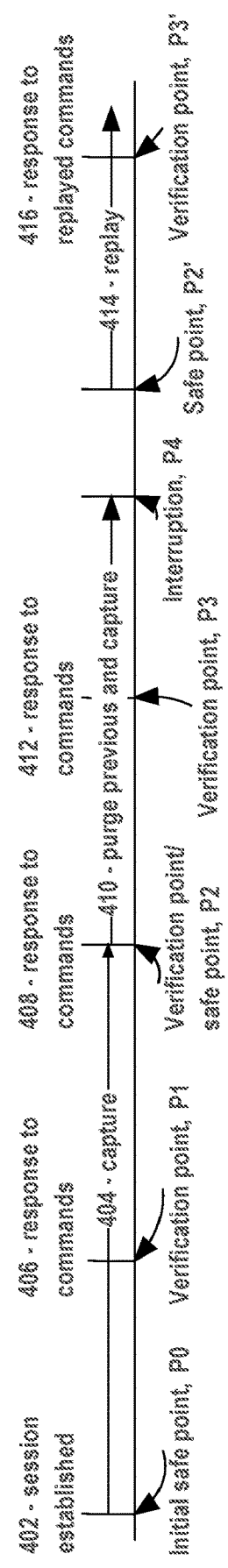
FIG. 4 is a graph that depicts the lifecycle of a session, in one or more embodiments.

FIG. 4 is a graph that depicts a lifecycle of a session, in one or more embodiments. At point 402 in the lifecycle, a new initial session state is established with DBMS 140. DBI Application 112 may request session pool manager to retrieve a session from a session pool to connect with DBMS 140 at initial safe point P0.

In another embodiment, the session may be already established, and DBI application issues a request boundary to client driver 114 at 402. DBI application 112 is configured to issue a beginning request boundary when DBI application 112 is about to start a new unit of work that may require the database interface to invoke database commands. When using request boundaries, the DBI application 112 also issues an end request boundary at the logical point at which DBI application 112 has finished performing the unit of work over the connection and does not expect to invoke the database interface for that unit of work. In an embodiment, when a request boundary is issued, a request boundary marker, such as "beginRequest" or "endRequest," for start and end of a new unit of work, is inserted into a database command sent to client driver 114. Since the unit of work is associated with application 112's work cycle, at the end or before the beginning of such cycle database client driver 114 may assume that safe point P0 has been reached by application 112.

Replay driver 118, or DBMS 140 may detect safe points, such as safe point P0, by monitoring for the application opening and closing pooled connections or other techniques described herein. For example, DBMS 140 may detect a request boundary, when client driver 114 of DBI application 112 propagates a suggested request boundary to DBMS 140 or may apply heuristics to identify a request boundary. DBMS 140, as part of its monitoring, detects the beginning request boundary and/or the end request boundary and indicates to replay driver 118 that safe point P0 has been reached.

Once the safe point is notified or detected, replay driver 118 starts capturing issued database commands through the session in replay context throughout 404.

Detecting Change in Session State

DBMS 140 and/or replay driver 118 may generate a request boundary or a verification point at an arbitrary point in a lifecycle of a session. In one embodiment, DBMS 140/client driver 114 capture session state of a session with client system 110 at each roundtrip and generates a verification point information, in case that session needs to be recreated. One or more aspects of the session state may be captured by DBMS 140 in the form of one or more session templates, individual session attribute-value pairs, and/or objects. The techniques described below are applicable to any form of capture of change in a session aspect. In the example, the database may store templates that describe the session state and share a template key to replay driver.

In an embodiment, session state tracker 148 detects any change to one or more aspects of a session state. When DBMS 140 receives a set of commands from client driver 114, the commands itself either contain explicit changes to one or more of the state aspects and/or the execution of the set of commands causes changes to the one or more of the state aspects. For example, the set of commands received from client driver 114 may include an "ALTER SESSION" command that explicitly alters a particular aspect of the session state (e.g., updates language, time/date). As another example, the set of commands may (additionally or alternatively) contain commands that create a temporary large object (LOB) and thus also alters that particular aspect of the state. Such changes to a session aspect are recorded into a session state summary and send individually or as part of the session state summary to replay driver 118 for storage in replay context, in one embodiment.

Furthermore, the same set of commands that has commands that have implicitly or explicitly affected an aspect of session state may also include a command that removes the effect of such a command. As a continuation of the above example, the set may include another "ALTER SESSION" command that changes a session attribute value back to the original value and/or may contain a command that deallocates the temporary LOB. Accordingly, a change to a session aspect that occurred during an execution of a set of commands may be reverted by the same set of commands.

Figure 5:
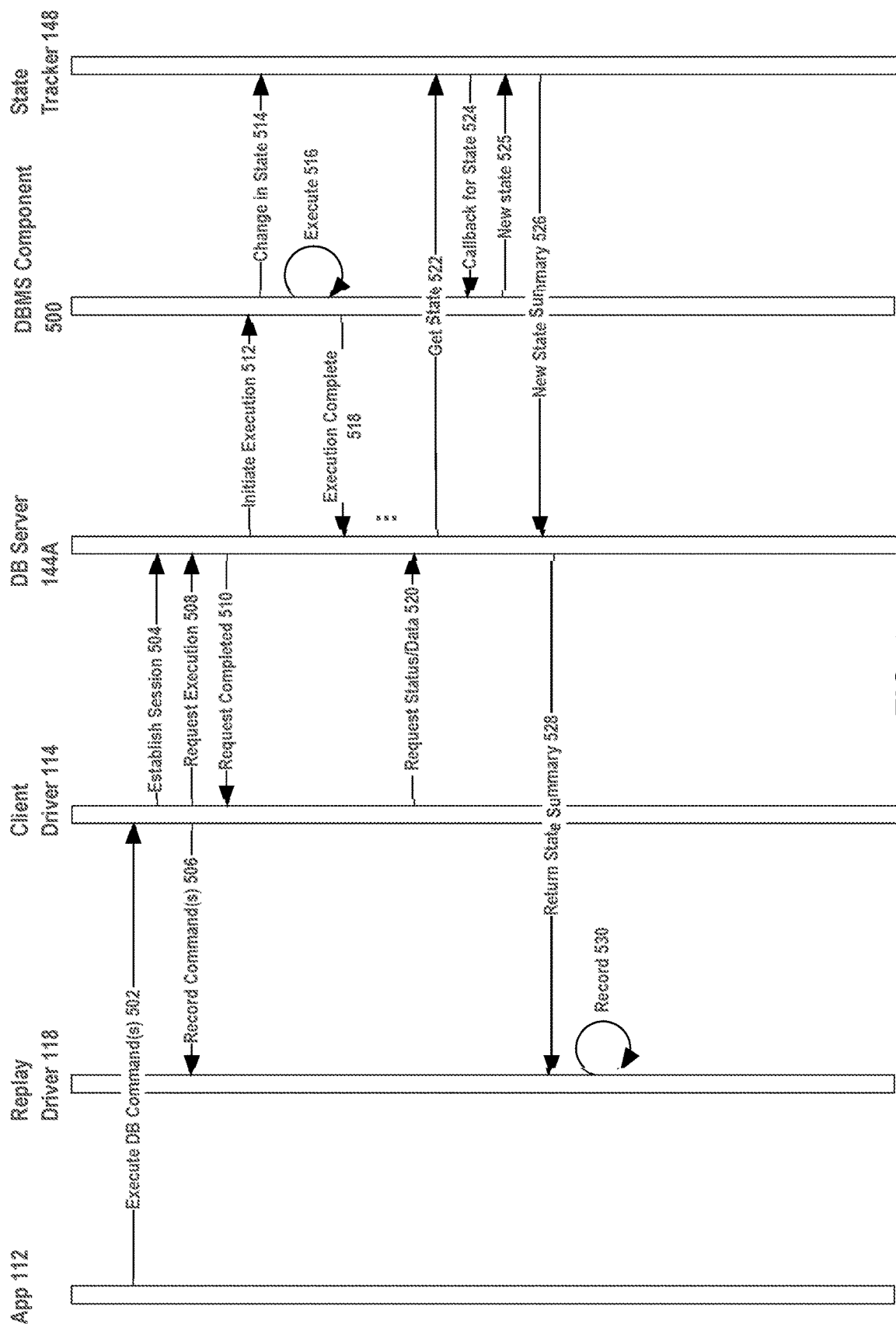
FIG. 5 is a sequence diagram that depicts the process for generating a verification point for execution of a set of commands, in an embodiment.

In an embodiment, session state tracker 148 verifies before returning the status on a set of commands, which of the state aspects that have been changed indeed have stayed changed. FIG. 5 is a sequence diagram that depicts the process for generating a verification point for execution of a set of commands, in an embodiment. DBI Application 112 sends a request to execute one or more commands at step 502. Client driver 114 establishes a session with DBMS 140 and in particular with database (DB) server 144A of DBMS 140 at step 504. Replay driver 118 may record the requested database commands at step 506 by storing the commands in replay context. Alternatively, replay driver 118 may perform those steps after receiving the request status at step 510 or after receiving execution status/return data at step 510.

In response to receiving the request for execution of the set of commands at step 510, DB server 144A initiates the execution at step 512 by invoking a component of DBMS 140, DBMS component 500, in an embodiment. At step 514, DBMS component 500 invokes state tracker 148 to notify state tracker of potential change in state of an aspect of session managed by DBMS component 500. At step 516, DBMS component 500 continues the execution and updates the aspect of session state accordingly. For the set of commands received by DB server 144A at step 508, DBMS component 500 may be invoked multiple times and each time DBMS component 500 may update the aspect of session state according to the performance of the execution.

For example, one of the commands in the set of commands may include a statement for creating a temporary table. Execution of such statement by DB server 144A invokes the temporary object manager component of DB server 144A to create a temporary table. The temporary object manager component invokes state tracker 148 to notify that for the current session, the state has been changed for the aspect describing the existence of a temporary table in the session.

In an embodiment, state tracker 148 instantiates and maintains a list of known session aspects and the changes that have been applied to those aspects. The state tracker 148 may maintain the aspects as individual session attribute-value pairs/objects and/or as session templates, each template being a collection of session attribute-value pairs. For illustrative purposes, the aspects of the session state may be described as session attribute-value pairs. However, the same techniques are applicable for the aspect(s) represented by a session template. Table 3 depicts an example list of attributes which may be tracked as standalone or as part of the corresponding session template. The metadata of the tracked attributes indicates their corresponding session aspect's state.

TABLE 3

Example list of tracked attributes

| Name | Classification | Changed? | Has State? | New Value |
|---|---|---|---|---|
| LANGUAGE | Client restorable | | | |
| NLS_CALENDAR | Client restorable | | | |
| NLS_DATE_FORMAT | Client restorable | | | |
| SECURE_ROLES | Server restorable | | | |
| APPLICATION_CONTEXT | Server restorable | | | |
| PLSQL_STATEMENT | Non-restorable | | | |
| DBMS_LOB | Non-restorable | | | |
| TEMPORARY_TABLE | Non-restorable | | | |

The metadata of a session attribute or a collection of session attributes in a session template includes the classification of the corresponding attribute or the collection of attributes. As discussed above, the classification of an attribute indicates whether the value of the session attribute can be restored. Additionally or alternatively, the classification may indicate which component of a system is responsible for restoring the attribute. For example, the type may indicate server restorable for attributes which values are restored by a database server of a DBMS. Client restorable attributes indicate that the client system, whose application has created the captured session on the DBMS, has knowledge about the session attribute and is able to restore the value of the attribute if necessary. In some embodiments, the restore is performed by the DBMS using the stored templates that include one or more client-restorable attributes.

State tracker 148 may maintain and update information on changes to session attributes as part of the metadata. In an embodiment, the change information is represented by the existence of a modified state for the session attribute. In another embodiment, the change information for a session attribute is represented by a) whether execution of command(s) in a session has affected an aspect of the session state and b) if so, whether the modified state of the corresponding aspect has persisted when status of the execution is returned to the client system. In such an embodiment, no capture is triggered unless the change to the aspect of session exists at the end of the client call. Computational resources are saved by avoiding any processing of session attributes which changed state fails to persist through a client system call. Other embodiments may use delimiters other than the end of the client call to check for the persistence of the change to an aspect of session state—e.g., an end of the transaction for which the session state-altering commands were executed.

Continuing with FIG. 5, at 518, the execution of commands is complete by 518, and the corresponding aspect of session state may have been changed. Many component DBMS 140 may be invoked during the execution of the client requested command. Continuing with the above example of the temporary object management component executing a creation of a temporary object, such creation affects "TEMPORARY_TABLE" session aspect. The temporary object management component updates the metadata to indicate that the "TEMPORARY_TABLE" session aspect has changed.

As a further example, one of the received commands may instantiate a large object (LOB). This causes the appropriate component to update state tracker 148 that the DBMS_LOB has changed. Another command in the received commands may deallocate the instantiated LOB after the LOB has been used in processing. This command may also cause the appropriate component to update the "DBMS_LOB" session metadata to reflect that there has been a change (regardless that the current change undoes the previous change in the state).

Other components may also modify other aspects' state information. For example, "ALTER SESSION" statement for the "LANGUAGE" attribute may be received from Client Driver 114. The session manager on DBMS 140 may process the statement in addition to updating the value for the "LANGUAGE" session attribute also update the metadata to indicate a modified state.

Side Effects

In some embodiment, DBMS components are invoked through autonomous transactions, external PL/SQL and server-side Java callouts, or C routines and libraries for example that may create side effects, which are separate from a received database request. The term "side effect" refers herein to the results from an execution of one or more commands which causes changes outside a DBMS, such as sending email, transferring files. For example, database command(s) may have side effects that include email and notifications using DBMS_ALERT calls, copying files using DBMS_PIPE and RPC calls, writing text files using UTL_FILE calls, making H5P callouts using UTL_HTTP calls, sending email using UTL_MAIL calls, sending SMTP messages using UTL_SMTP calls, sending TCP messages using UTL_TCP calls and accessing URLs using UTL_URL calls. Such database commands with side-effects may leave persistent changes even when the transactions that included the commands are rolled back.

In one embodiment, DBI application 112 may include logic to configure replay driver 118 to disable commands with side effects during the replay to avoid causing the same side effect more than ones. In another embodiment, Application Continuity may not rely on knowledge about the application to recognize and disable side effects when recovering a session state during a replay. During command executions (such as step 516), one or more executions of side effects are detected. The type of side effect is distinguished between those that relate to the application's logic and those that are internal to DBMS execution of the database request. For internal DBMS side effects, the statement(s) executing within side effect(s) are needed to restore session state(s). In an embodiment, at a point when it is determined that one or more of such statements are not needed, the capture of statements for a replay is disabled. When it is determined that one or more statements do not produce any side-effects or produce only internal side effects, the capture of the statements for a replay is automatically re-enabled. The application level side effects may be differentiated based on maintaining a list of side-effect statements to be replayed and based on detecting internal usage of a side-effect statement (such as which DBMS 140 component is invoked).

The Application Continuity may not replay application-related side-effect statements. In another embodiment, an application related side effect is purged from the replay context or not recorded at all for a replay based on the configuration by DBI application 112. If the Application Continuity is configured to ignore application-related side-effects during a replay, then the Application Continuity causes replay context of replay driver 118 not to include any side-effect statement.

On the other hand, if the Application Continuity is not configured to ignore application-related side effects, then the DBMS 140 component that processes the side-effect statement causes the session state to reflect the existence of the side effect. The existence of a side-effect in a replay context makes the recorded commands that include the side-effect statement un-replayable until the next safe point.

Obtaining Session State

Continuing with FIG. 5, at step 520, DB server 144A may receive a request from client driver 114 for the status/response for the commands requested for execution at step 508. Table 4 below depicts example updates to metadata of the above-described session aspects when DBMS 140 receives status/response request for the above-mentioned sample commands:

TABLE 4

Example list of tracked attributes

| Name | Classification | Changed? | Has State? | New Value |
|---|---|---|---|---|
| LANGUAGE | Client restorable | Yes | | |
| NLS_CALENDAR | Client restorable | No | | |
| NLS_DATE_FORMAT | Client restorable | No | | |
| SECURE_ROLES | Server restorable | No | | |
| APPLICATION_CONTEXT | Server restorable | No | | |
| PLSQL_STATEMENT | Non-restorable | No | | |
| DBMS_LOB | Non-restorable | Yes | | |
| TEMPORARY_TABLE | Non-restorable | Yes | | |

Determining New Session State

At step 522, DB server 144A requests the states of changed aspects of the session from state tracker 148. State tracker 148 iterates through every changed aspect and requests the corresponding component to provide whether a modified state has been created by the change. Although step 524 in FIG. 5 depicts only a single component, DBMS component 500, in other embodiments, state tracker 148 queries many and in some embodiments, all DBMS components that may affect an aspect of session state. State tracker 148 may do so using a call back registered by each component for the aspect of the session. In an embodiment, state tracker 148 determines which DBMS component to query based on the indication of the changed session aspect(s) in the session metadata. For example, the session metadata indicates that DBMS component 500's execution at step 516 has changed a particular aspect of the session state. At step 524, state tracker 148 queries DBMS component 500 to determine whether the change has generated a modified state of the session aspect and may receive information about the modified states at step 525.

In an embodiment, if the change has caused a modified state to be generated for the aspect of the session, a data representation of the modified state is generated and returned to state tracker 148 at step 525. The term "attribute state signature" refers to such a data representation. The attribute signature may be the new value of the corresponding session attribute itself or a unique representation thereof. Example of a unique representation is a hash-based representation of the new value.

In an embodiment in which the change affects an attribute which is part of a session template, a new session template is generated using the techniques described herein, and the identifier of the new session template is used for an attribute state signature. In some embodiments, the values/templates/objects of a non-restorable attribute may not be returned, even if there has been a state change of the non-restorable attribute caused by the change. Attributes such as "TEMPORARY_TABLE" or "DBMS_LOB" may reference objects that are very large and for which generating a signature would not be practical. For this reason, the appropriate component may only return an indication that a modified state has been generated by the change.

In an embodiment, after state data for a changed session aspect is retrieved, the indicator of change to the session aspect is reset to denote that the state for the change has been already processed.

Continuing with the example based on above Table 4, state tracker 148 determines from the session state metadata depicted in Table 4 that there has been a change that may have affected "LANGAUGE" aspect of the session state. State tracker 148 requests the session manager to determine whether the "LANGUAGE" aspect has a modified state. In response, the session manager confirms and provides the new session attribute value or a data representation thereof. Similarly, based on the session state metadata depicted in Table 4, state tracker 148 requests state information for the "DBMS_LOB" aspect. Since the LOB that has caused the indication change has been since deallocated, state tracker 148 receives that no change in state for "DBMS_LOB" has occurred. On the other hand, the change for "TEMPORARY_TABLE" is determined to have caused a modified state. However, a new value for the state is not returned since "TEMPORARY_TABLE" is a non-restorable attribute. Accordingly, after callbacks for every changed session aspect are performed, Table 5 depicts an example metadata for session state attributes.

TABLE 5

Example list of tracked attributes

| Name | Classification | Changed? | Has New State? | New Value |
|---|---|---|---|---|
| LANGUAGE | Client restorable | No | Yes | 5 |
| NLS_CALENDAR | Client restorable | No | No | |
| NLS_DATE_FORMAT | Client restorable | No | No | |
| SECURE_ROLES | Server restorable | No | No | |
| APPLICATION_CONTEXT | Server restorable | No | No | |
| PLSQL_STATEMENT | Non-restorable | No | No | |
| DBMS_LOB | Non-restorable | No | No | |
| TEMPORARY_TABLE | None-restorable | No | Yes | N/A |

In an embodiment, DBMS component 500 executes a statement with a side effect at step 516. In response to the callback for session state at step 524, DBMS component 500 returns an indication about the existence of a side effect. In an embodiment in which no configuration exists for ignoring side-effects, as discussed above, the indication of side-effect is recorded as part of the session state summary.

Generating Session State Summary

Continuing with FIG. 5, at step 526, state tracker 148 generates a session state summary based on the received states for various session aspects and sends the session state summary to client system 110 at step 528. In an embodiment, a session state summary includes information on states from changed session state aspect(s) and in some embodiments, further includes information on unchanged aspects of session state. Combined session state signature may be created by generating an array or mathematically combining session attribute value pairs and/or attribute state signatures. In an embodiment, the state signature is generated based on the states of changed aspects of the session and thus, is a unique data representation of the changed session aspect(s). Accordingly, using techniques described below, the state signature may be used by Application Continuity to verify during the replay that the same session state is generated as in the original session.

In one embodiment, session attribute signatures are combined based on classifications of included session aspects. For example, the restorable attributes/templates may have separate state signature from the non-restorable ones, or client restorable from server restorable from non-restorable ones. In such an embodiment, the combined session state is represented by multiple state signatures, and each of those signatures may be compared by Application Continuity for the verification of the replay using techniques described below.

In such an embodiment, a session state summary for classification of session aspects includes an indication whether any of the session attributes of the classification has a modified state. If any of the session attributes or session templates for the classification has been determined to have modified states, then the session state summary of the classification reflects an indication of the existence of the modified state for the classification. Otherwise, if no session attribute/template has been determined to have a modified state, then the session state summary for the classification reflects that no state has changed. For example, based on Table 5's example modified states of attributes, since the client-restorable "LANGUAGE" attribute has been determined to have a modified state, then the session state summary for the client restorable attributes includes an indication of modified state. Similarly, the non-restorable attributes have a modified state for the "TEMPORARY_TABLE" session attribute, and thus, the session state summary reflects for the non-restorable attributes reflects the same. On the other hand, none of the server restorable attributes are affected, and thus, the server restorable attributes have no modified state. Accordingly, the session state summary for server restorable indicates no modified state.

Table 6 below depicts the content of example session state summaries for classifications based on example session attributes of Table 5.

TABLE 6

Session State Summaries for Classifications

| Classification | Has State? | Signature |
|---|---|---|
| Client restorable | Yes | 5 |
| Server restorable | No | |
| Non-restorable | Yes | |

Continuing with FIG. 5, the generated session state summary is returned to DB server 144A, in response to a request for the session state at step 522. DB server 144A returns the received session state summary to replay driver 118 to be stored in the replay context at step 530. In some embodiments, with the session state summary, DB server 144A may return to replay driver 118 session attribute-value pair(s) and/or session template(s), which are represented by the session state summary and are recorded with the session state summary in the replay context.

The recorded session state summary provides a verification point for replay driver 118. For example, continuing with FIG. 4, at 406 point in the lifecycle of the session, a session state summary may be generated at the end of the round trip for the commands. The generated session state summary with the corresponding session attribute-value pairs/session templates, provide for verification point P1. During a replay by Application Continuity, at least the session aspects summarized in the session state summary may be verified. If the session state summary reflects all aspects of session state at 406 that have modified states, then, during the replay by Application Continuity, the complete session state is verified to match the session state summary at verification point P1.

Safe Point

In an embodiment, client system 110 determines that a possible safe point may be present. The term "safe point" refers to a point in a lifecycle of a session at which an accurate execution of future commands does not depend on the previously executed commands so long as the session state at the point is restorable and is restored. Thus, a safe point is similar to request boundary but is not explicitly requested by DBI application 112. Instead, replay driver 114 and DBMS 140 suggests a safe point to DBMS 104 without any assistance from DBI application 112. The database will decide if this a safe point or not. The database has the session state knowledge. Accordingly, a safe point is also referred to as an "implicit request boundary".

In another embodiment, DBMS 104 detects a safe point in a lifecycle of a session. Such an approach is used for draining during planned operation, and also to invoke failover during planned operation. Using this approach, DBMS 104 notifies replay driver 118 that an implicit boundary is detected. Based on a session state summary, a replay driver may also suggest implicit boundaries to DBMS 104 because replay driver 118 records information before application 118 use the information to request DBMS 104 to execute commands.

When DBMS 104 (and/or replay driver 118) generates a safe point or approves a safe point suggested by the replay driver, the information that is up to but not including the safe point may be purged from the replay context. Because the implicit request boundary can be used as a starting point for initiating a replay of commands from the replay context, anything before the safe point in replay context is not necessary anymore. Because implicit boundaries may be identified more often in a lifecycle of the session, thus lesser captured information is needed to be stored in a replay context. Therefore, a client computer system significantly improves its performance by increasing storage efficiency and saving any compute resources for maintaining the otherwise purged replay context.

Figure 6:
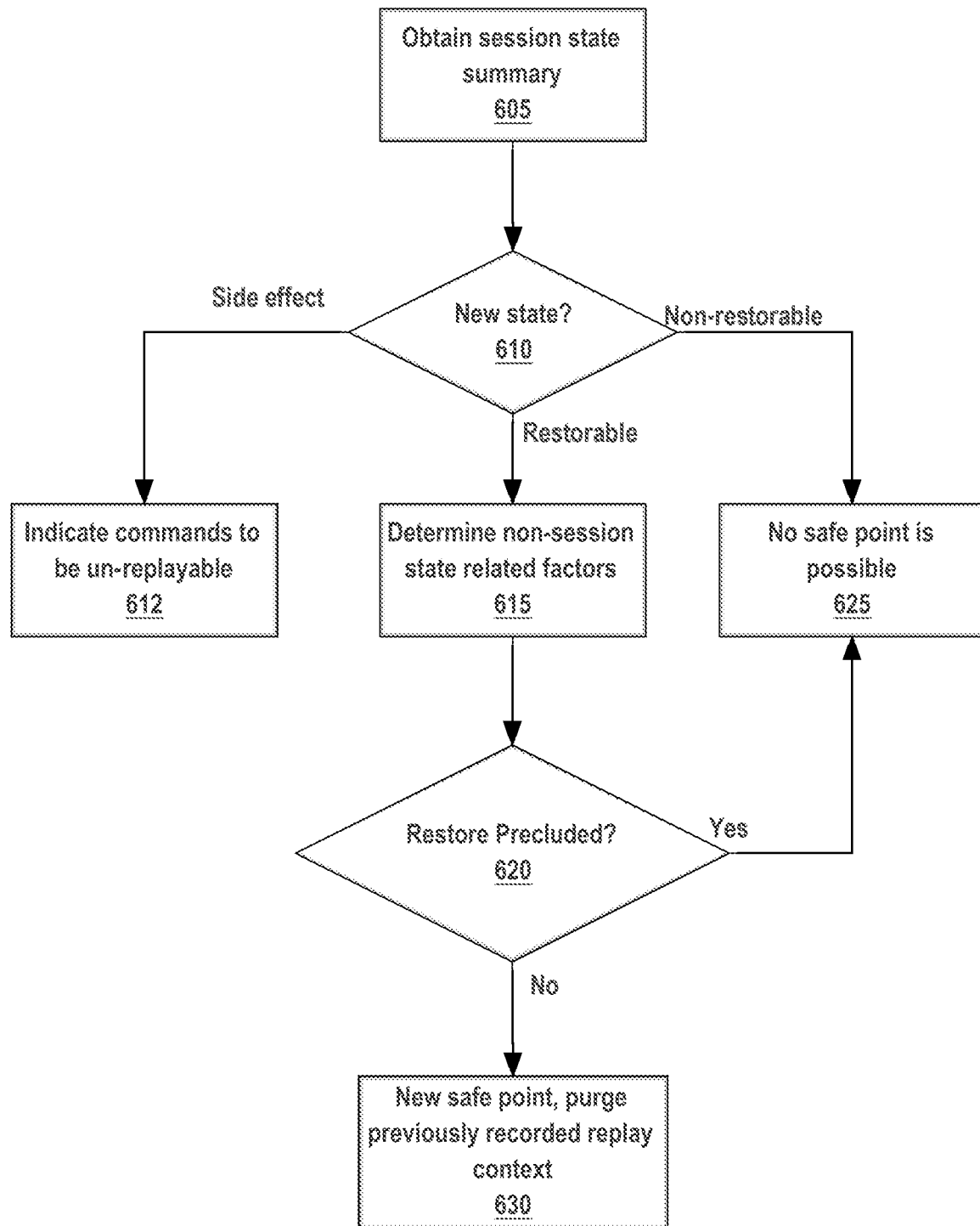
FIG. 6 is a flowchart that depicts a process for determining whether a point in a lifecycle of a session is a safe point, in an embodiment.

FIG. 6 is a flowchart that depicts a process for determining whether a point in a lifecycle of a session is a safe point, in an embodiment. At step 605, a session state summary for the point in the lifecycle of the session is obtained. Client system 110 may obtain the session state summary from the replay context. Alternatively, the session state summary may be received with the status of the executed commands. The session state summary contains one or more session state summaries for restorable session attributes/templates and one or more session state summaries for non-restorable session attributes/templates. Additionally or alternatively, at step 605, metadata about individual session attributes/templates is obtained.

At step 610, the process determines whether any non-restorable session state summary/attribute/template has a modified state. If so, then the process proceeds to step 625 indicating that no safe point is possible. If, at step 610, no modified sate exists for non-restorable and/or only modified state exists for restorable (client or server restorable), then the process proceeds to step 615.

For example, if for verification point P1 of FIG. 4, a session state summary is received that includes information in Table 6, then verification point P1 fails to qualify as a restorable point. Non-restorable session state summary has a modified state, which means it is impossible to restore the same session state as is at that point.

In a further example, at point 412 of FIG. 4, further received commands have modified the previous session state captured by Table 5. As part of the execution of the commands, the temporary table(s) allocated for the previous commands are de-allocated, and thus, no modified state exists for "TEMPORARY_TABLE" attribute. The execution has further caused an update to the application context, thus creating a modified state for "APPLICATION_CONTEXT" attribute. Table 7 depicts an example list of attribute-value pairs, and their metadata after state tracker 148 completes performing callbacks to DBMS components to determine the corresponding state at point 408 of FIG. 4:

TABLE 7

Example list of tracked attributes

| Name | Classification | State Exists? | New Value |
|---|---|---|---|
| LANGUAGE | Client restorable | Yes | 5 |
| NLS_CALENDAR | Client restorable | No | |
| NLS_DATE_FORMAT | Client restorable | No | |
| SECURE_ROLES | Server restorable | No | |
| APPLICATION_CONTEXT | Server restorable | Yes | 7 |

TABLE 7-continued

Example list of tracked attributes

| Name | Classification | State Exists? | New Value |
|---|---|---|---|
| PLSQL_STATEMENT | Non-restorable | No | |
| DBMS_LOB | Non-restorable | No | |
| TEMPORARY_TABLE | Non-restorable | No | |

The session state summary for each classification reflects the existence of modified states at verification point P2, as depicted in Table 8.

TABLE 8

Session State Summaries per Classification

| Classification | Has State? | Signature |
|---|---|---|
| Client restorable | Yes | 5 |
| Server restorable | Yes | 7 |
| None-restorable | No | |

Because non-restorable session state summary has no modified state, and it is only the restorable session state summaries that have modified states, verification point P2 may be a safe point.

Continuing with FIG. 6, at step 615, other factors are evaluated. In an embodiment, the evaluation determines whether any cursor is open, any transaction is open, any reference cursor exists, any temporary LOB locator is allocated for the session. If any such object/transaction/reference exists, then the process proceeds to step 625, and the verification point cannot serve as a safe point. Otherwise, the process proceeds to step 630.

At step 630, replay driver 118 may identify the verification point for which the session state summary is obtained as a safe point. Accordingly, any new commands may be replayed from the newly created safe point. Replay driver 118 has no need to start replay from the initial request boundary. Instead, the newly generated safe point corresponds to an implicit request boundary at which an accurate session state can be restored. Since replay driver 118 has no need to replay any command prior to the safe point, all the commands and related metadata in replay context captured up to the safe point are erased. The purge frees up storage resources and saves considerable computational resources during the replay by replaying significantly fewer commands.

Safe Points to Drain or Failover Sessions

With knowledge of safe points, DBMS 104 may force a planned failover at such points because DBMS 104 (or replay driver 118) has determined that the session is replayable and that the session is unlikely to drain due to application 118. This is primarily used for shedding sessions during planned operations such as planned maintenance or load rebalance in conjunction with draining. For planned operations, DBMS 104 marks session to drain for a planned operation because not all sessions will drain. The purpose of adding planned failover is to proactively failover sessions that the DBMS 104 expects will not drain.

According to one embodiment, to perform such draining, a safe point is generated by detecting that one or more of the rules have been satisfied. One or more techniques to perform draining are further described in the application entitled "Safe Release of Database Sessions for Planned Maintenance Operations."

In such an embodiment, when a disconnection-requiring planned operation is initiated, the DBMS 104 may initiate continuous monitoring of requests over database sessions until one or more of the set of rules are satisfied, and only then may disconnect the database session and/or fail the session over to a new instance, where a failover of a session is determined to be expected to succeed.

Detecting for a safe point to release a session may occur at one of at least three levels:

1) Connection Pool Release—in a pooled environment using compatible pools, client-driver 114 identifies when connections are borrowed and released from usage;
2) Client driver 114 detection—when notified, client-driver 114 initiates a detection for the satisfaction of rules that indicate that the application is acquiring or releasing the session;
3) DBMS detection—DBMS 104 marks sessions to be released and initiates a detection for the satisfaction of rules that indicate that the application is acquiring or releasing the session, or that the application is at a safe point where failover of the database session should succeed.

The first and second approaches cause a local (to application server) detection that does not reach DBMS 104 (referred to herein as "local connection tests"). The third approach is applicable for any application (regardless whether the application server includes client driver 114).

In an embodiment, one or more rules use one or more of the following conditions to determine whether to drain a session. The conditions include:

a. Detecting a connection test over to test the validity of the database connection;
b. Detecting the application is outside of an application request boundary based on the received application request boundary commands. The term "request boundary" refers herein to a tag that indicates when a session is opened and when the session is released. Request boundaries may be communicated to a DBMS. Client driver 114 of the DBMS may also detect request boundaries;
c. Detecting a return of a database connection to a connection pool managed by a CPM within a Client driver 114;
d. Detecting that a database request is starting or ending— the term "database request" refers herein to a group of one or more database commands that are generated as a result of an application performing a unit of work; or
e. Detecting that the database session has one or more session states that are recoverable, and these session states may be re-established over a different session over a different connection with another a database server running an instance of the same database.

Non-limiting examples of the rules for determining whether to drain a session are provided below:

1) Session is in an "idle period" for above a threshold of time period such as a threshold percentage of time the session has been established (e.g., above 10%). The term "idle period" refers herein to a continuous period in a session's lifecycle when no request is being received through the session indicating the session pool and the client-driver is not draining, and one or more implicit/explicit request boundaries are detected.

2) Start of an explicit request boundary is received. The rule may use the one or more of the following conditions:
   The session has an occurrence of implicit request boundaries.
   Prior to receiving the start of the request boundary, an explicit end request boundary has been received.
   Prior to receiving the database request of the request boundary, the session was in an idle period.
   The database request size exceeds timeout set for draining a session.
   The session was in an idle period prior to connection test, if a connection test has been used.
3) End of an explicit request boundary is received.
4) Start of an explicit request boundary is received, and the next database request is received. The rule may use the one or more of the following conditions:
   The session was in an idle period prior to the databases request of the request boundary, and session pools are not draining.
   The receipt of the next request indicates that the FAN was not received.
   The client driver may initiate a failover.
5) An implicit boundary, a safe point, is detected. The rule may use the one or more of the following conditions:
   More than one database requests have been through the session.
   Session state is recoverable.
6) The database request size exceeds timeout set for draining a session. The rule may use the one or more of the following conditions:
   The database request is estimated not to complete before drain timeout of the session.
   The database request is likely to be disabled.
   The session state is recoverable.
7) A completed or no transaction is detected in a database request of a session. The session may drain at the completion or when no transaction is detected. The rule may use the one or more of the following conditions:
   The database request includes a transaction that is likely to commit and complete.
   The database request includes no transaction
8) An in-flight transaction is detected in a database request of a session. The session may drain before the completion. The rule may use the one or more of the following conditions:
   The transaction is unlikely to commit or will commit, but commit may not be complete.
   The database request includes no transaction.
   The session state is recoverable.

In an embodiment, once a DBMS or a client-driver 114 detects a safe point to release a session matching one or more of the rules, the database session may be disconnected. Disconnection of a session may include a disconnection of the database connection when the session uses a dedicated connection. In an embodiment, in which a connection is shared between multiple sessions, a disconnection of a session may not cause the disconnection of the connection unless the disconnected session is the last active session on the connection. The reference to disconnecting/releasing a connection, unless stated otherwise, refers herein to disconnecting the last active session on the connection, if any, or disconnecting the session to which the connection is dedicated, if the session is still active.

Because the disconnection occurs at a safe point, the application is not disturbed and gracefully handles the disconnection with no interruption to the application.

Interruption and Re-Establishing of Session with New Database Server

Continuing with FIG. 4 that depicts a sample lifecycle of a session, at point P4 of the session lifecycle, the session is interrupted. The interruption may be due to a critical failure of database server 144A with which the session was established. Other planned or unplanned maintenance may also cause an interruption in the session lifecycle. For example, the Application Continuity may be automatically invoked following a recoverable error. A recoverable error is an error that arises due to an external system failure, independent of the application session logic that is executing. Recoverable errors may occur following planned and unplanned outages of foregrounds, networks, nodes, storage, and databases. The application receives an error code that may leave the application without status for the last operation submitted.

In an embodiment, client driver 114 detects the interruption in the session and initiates replay driver 118 to re-establish a new session with database server 144B and to rebuild the session state with continuity director 146 on database server 144B to match the state at interruption point P4. Client driver 114 connects with DBMS 140, and a connection is established with database server 144B. Database server 144B may be selected to load balance and/or unavailability of one or more other database servers such as database server 144A.

At the establishment of the session, DBI application 112 may invoke the same commands as performed by DBI application 112 when any regular session is newly established. This may include, commands to perform authentication, role-based authorization, and other aspects of initial session state generation at initial safe point P2' of the new session lifecycle, as depicted in FIG. 4.

In an embodiment, replay driver 118 records the newly established initial state to compare with the previous initial state at point P0. Replay driver 118 may record the initial state by generating a session state summary using the techniques described above.

Verification for a match of initial states ensures that any previous state that existed in a newly borrowed session from the session is properly cleaned up. Furthermore, the initial state comparison verifies that the starting state, at which the rest of the session state is rebuilt, is the exactly the same initial state as in the original session. In an embodiment, the Application Continuity verifies that the initial session state fully matches the original session's initial state by matching the new initial state's summary with previously generated session state summary. For example, the signatures of the summaries may be compared and to determine whether a match exists. If not matched, DBI application 112 may be notified about the mismatch. Additionally or alternatively, if mismatched, replay driver 118 may re-establish a new session with DBMS 140 and re-perform the verification.

Rebuilding Safe Point State

The replay context of replay driver 118 may start at a safe point further along the lifecycle of the session rather than at the initial safe point, at which the original session was established. In such an embodiment, replay driver 118 along with continuity director 136 restores the session state at the replay starting safe point. In an embodiment, replay driver 118 uses the session state summary to determine whether which, if any, client restorable and/or server restorable aspects of the state are to be restored.

When a restorable aspect of the session is to be restored, the session state tracker retrieves one or more attribute-value pairs for the restorable aspect and generates the appropriate commands to restore the session aspect on the new session. In an embodiment in which a client restorable aspect of the state is to be restored for the safe point, replay driver 118 queries the replay context for the saved state aspect information and based on the information, generates the appropriate command through the new session. The client-generated command is issued causing the restoring of the session aspect on the session. Thus, a client restorable session aspect is restored by one or more commands from client system 110's replay driver 118 to establish the same state aspect on the new session. For example, the replay driver 118 may retrieve the attribute-value pair for the session aspect in the form of a command such as the "ALTER SESSION" command, or generate the command based on the retrieved the attribute-value pair.

In an embodiment in which a restorable aspect of the state is to be restored for the safe point, replay driver 118 queries the replay context for the identifier of the session template that includes the information on the aspect. To restore the aspect's state, replay driver 118 requests continuity director 146 to retrieve the template with the identifier from database 142 using techniques described above and apply the session attribute-value pairs included in the template to the new session. To apply a session attribute-value pair to a new session, session state tracker 148 invokes the callback for the component of DBMS 104 that corresponds to the session attribute with the session attribute-value pair.

In an embodiment, the replay context stores multiple session template identifiers for the safe point, and thus, multiple templates are to be applied to restore the corresponding session aspect(s). If templates have a hierarchical order, then the templates are applied in reverse order of hierarchy from a lower layer to a higher layer. Stated differently, when the replay context indicates multiple hierarchical templates for a safe point, continuity director 146 first applies the session templates that are for components of DBMS 140 that are furthest away in the chain of invocations from a client database request. Such an application in the order of the hierarchy ensures that a higher component layer template can overwrite a session attribute value also present in a lower component. Replay 118 driver requests a template to restore at the initial state point of a session to re-build the appropriate session state (for multiplexing and at session borrowing from the session pool). The DBMS 104 expands the hierarchy itself by applying templates in the appropriate hierarchical order.

For example, if DBMS 140 is configured such that the session manager is layered above the service manager, and the service manager is layered above PDB, and PDB is layered above CDB. Accordingly, a session manager template is layered on a service manager template, which is layered on a PDB template, which is layered on a CDB template. And, the CDB template is applied first, followed by the PDB template, followed by the service template followed by the session management template. Thus, if the CDB template contains a particular value for a session attribute that also exists in session manager template, the application of the session manager template last causes the corresponding session manager attribute-value pair to override the particular value for the session attribute.

Additionally or alternatively, client restorable session aspects may be stored as template(s) in the replay context for a point in a lifecycle of a session, as described above. Using techniques described herein, replay driver 118 may retrieve a client restorable template for the safe point and apply the attribute-value pairs of the template on a new session to restore the corresponding session aspect's state.

Additionally or alternatively, server restorable session aspect may be stored as individual session attribute-value pair(s) in database 142. The session attribute value pairs for the safe point may be retrieved and applied accordingly on the new session to restore the corresponding session aspects.

Verifying Replay

The Application Continuity restores a session state by replaying the commands recorded from the starting safe point till the interruption of the session. Since the Application Continuity may insert safe points upon detection of conditions described above, the replay set of commands may be reduced. For example, if a safe point is inserted per each statement, then rather than replaying a database request that may include multiple statements, each statement may be treated as a request, and only a single statement may need to be replayed for recovering the session state. Thus, the rate at which the safe point of the session state moves forward is at smaller increments and the number of commands to replay to recover the session state is, thus, drastically decreased, producing a faster recovery.

Continuing with FIG. 4, safe point P2' is a restored safe point in a new session for the inserted safe point P2 in the interrupted session, in an embodiment. During period 414, replay driver 118 performs a replay of commands that have been captured during period 410. At point 416, based on the response received to the execution of the same commands as the response at point 412, verification point P3' is generated. The session state summary recorded at verification point P3 is compared with the session state summary at newly generated verification point P3' to determine if the replay has been successful.

Figure 7:
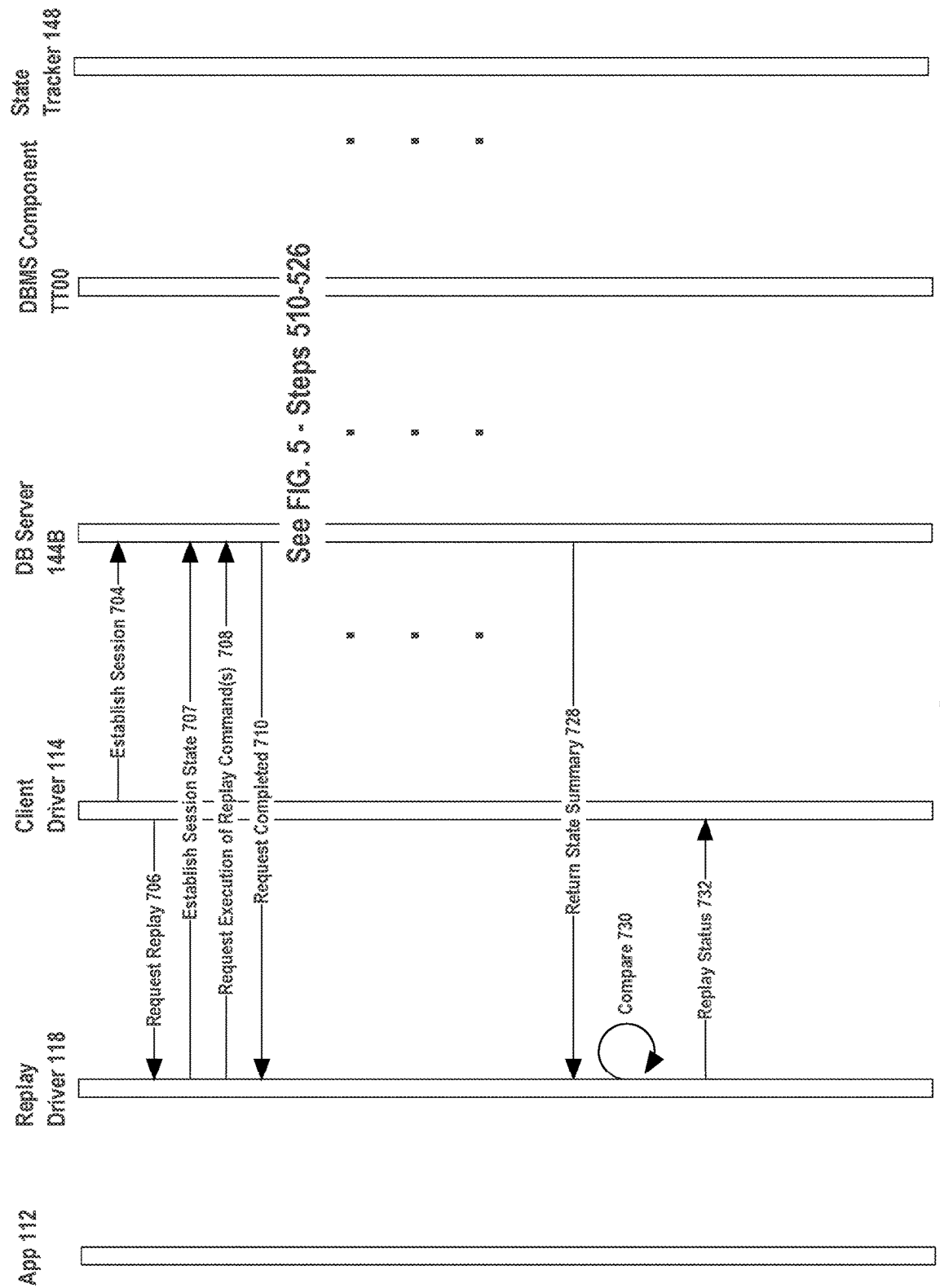
FIG. 7 is a sequence diagram that depicts a process for replaying commands and verifying the execution at a verification point, in an embodiment

FIG. 7 is a sequence diagram that depicts a process for replaying commands and verifying the execution at a verification point, in an embodiment. At step 704, a new session is established with database server 144B in response to the session with database server 144A being interrupted, and database server 144A not being available for reconnection.

At step 706, client driver 114 may request replay driver 118 to replay. Replay driver 118 identifies the safe point in the replay context from which to start the replay of commands and if necessary, restores the session state at the safe point at step 707 on the new session using techniques described herein.

At step 708, replay driver 118 initiates the replay of the captured commands by requesting DB server 144B to execute the commands in the same order as the commands were captured. Replay driver receives at step 710 the status for the request.

In an embodiment, the execution of replay commands occurs using the same techniques as described in steps 510-526 of FIG. 5, and verification point state summaries are similarly generated by state tracker 148.

Additionally, when the state summary for a verification point is returned to replay driver 118, such as at step 728, replay driver 118 compares the session state summary with the session state summary stored in the replay context associated with the verification point at step 730. For example, one or more session state signatures and/or session attribute signatures may be compared. If the summaries match, then the replay can proceed, and successful status is returned at step 732. Otherwise, if the summaries fail to match, then an error status is returned at step 732.

Mutable Functions for Replay

In an embodiment, the components of Application Continuity automatically analyze privileges and based on the analysis, grant the application a privilege to preserve mutable values in the automatic mode. When a request is replayed, the default and desired treatment of mutable objects may vary. A mutable function is a function that obtains a new value each time that it is called. The new value may vary each time that function is called. An example of a mutable is a call to SYSTIMESTAMP function. Client applications being recovered after an outage can determine whether to keep or ignore the result of a mutable function if the request is replayed.

Mutable function values may be kept for SYSDATE, SYSTIMESTAMP, CURRENT_TIMEZONE, SYS_GUID, and sequence.NEXTVAL. Mutable values may also be kept for many other mutable functions such as MIN, MAX, CURRENT_TIMESTAMP, LOCAL_TIMESTAMP and so on. If the original values are not kept and if different values for these mutable functions are returned to the client, a replay will be rejected because the client may see different results. If the application can use original values, the application can configure the behavior of mutable functions using the new KEEP clause for owned sequences and GRANT KEEP for other users. Sequence values may be kept at replay for many applications to provide bind variable consistency.

Table 9 shows examples of the configuration of mutable functions for replay. DBI application 112 may configure replay driver 118 for handling mutable function on replay.

TABLE 9

Example of mutable function configurations

| Mutable function | Configuration 1 | Configuration 2 | Configuration 3 |
| --- | --- | --- | --- |
| SYSDATE, SYSTIMESTAMP | Original | Original | Current |
| Sequence NEXTVAL and CURRVAL | Original | Original | (Not applicable) |
| SYS_GUID | Original | (Not applicable) | (Not applicable) |
| LOB access | Fail on mismatch | (Not applicable) | (Not applicable) |

In an embodiment, the components of Application Continuity automatically analyze privileges and based on the analysis, grant the application a privilege to preserve mutable values for owned objects. Accordingly, using the Application Continuity, Replay Drivers may replay database request using the original function results (that may have been preserved).

In an embodiment, the Application Continuity provides mutable value replacement at replay for function calls if GRANT KEEP or ALTER . . . KEEP has been configured. If the call uses database functions that support retaining original mutable values, including sequence.NEXTVAL, SYSDATE, SYSTIMESTAMP, and SYS_GUID, then, the original values returned from the function execution may be saved and reapplied at the replay. If an application decides not to grant mutable support and different results are returned to the client at the replay, replay for these requests is rejected.

To allow replay to keep and use original function results at replay:
The database user running the application may have the KEEP DATE TIME and KEEP SYSGUID privileges granted, and the KEEP SEQUENCE object privilege on each sequence whose value is to be kept. For example:
grant KEEP DATE TIME to user2;
grant KEEP SYSGUID to user2;
grant KEEP SEQUENCE on sales.seq1 to user2;
Note that GRANT ALL ON <object> does not include (that is, does not grant the access provided by) the KEEP DATE TIME and KEEP SYSGUID privileges and the KEEP SEQUENCE object privilege.
Do not grant DBA privileges to database users running applications for which replay is to be enabled. Grant only privileges that are necessary for such users.

Sequences in the application may use the KEEP attribute, which keeps the original values of sequence.NEXTVAL for the sequence owner, so that the keys match during replay. Sequence values are kept at replay for many applications. The following example sets the KEEP attribute for a sequence (in this case, one owned by the user executing the statement; for others, use GRANT KEEP SEQUENCE):
SQL>CREATE SEQUENCE my_seq KEEP;
SQL>—Or, if the sequence already exists but without KEEP:
SQL>ALTER SEQUENCE my_seq KEEP;
Note that specifying ALTER SEQUENCE . . . KEEP/ NOKEEP applies to the owner of the sequence. It does not affect other users (not the owner) that have the KEEP SEQUENCE object privileges. If NOKEEP is specified, the KEEP SEQUENCE object privilege is not granted to these users (or it is revoked from each if it has been granted to them).
To keep function results (for named functions) at the replay, the DBA grants KEEP privileges to the user invoking the function. This security restriction ensures that it is valid for replay to save and restore function results for code that is not owned by that user.

The Application Continuity may request preserving mutable values in one or more of the following cases: direct SQL calls, anonymous PL/SQL blocks with no calls to procedures owned by other schemas, owned user procedures or functions, with no calls to procedures owned by other schemas.

In an embodiment, a client application may alter the grant for preserving mutable function results, mutable values. The Application Continuity Report may record the database request that uses mutable function calls and may allow configuration to grant/revoke the preservation of mutables.

The Application Continuity Report may report that the side effects have been disabled for automatic replay. The Application Continuity Report may report that mutable functions have been preserved and the location for the preserved value for SYSDATE and SYSTIMESTAMP and SYSGUID mutable calls.

Database Management Systems

A database management system (DBMS), that may be hosted by a distributed system, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system, such as a distributed system, is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 8:
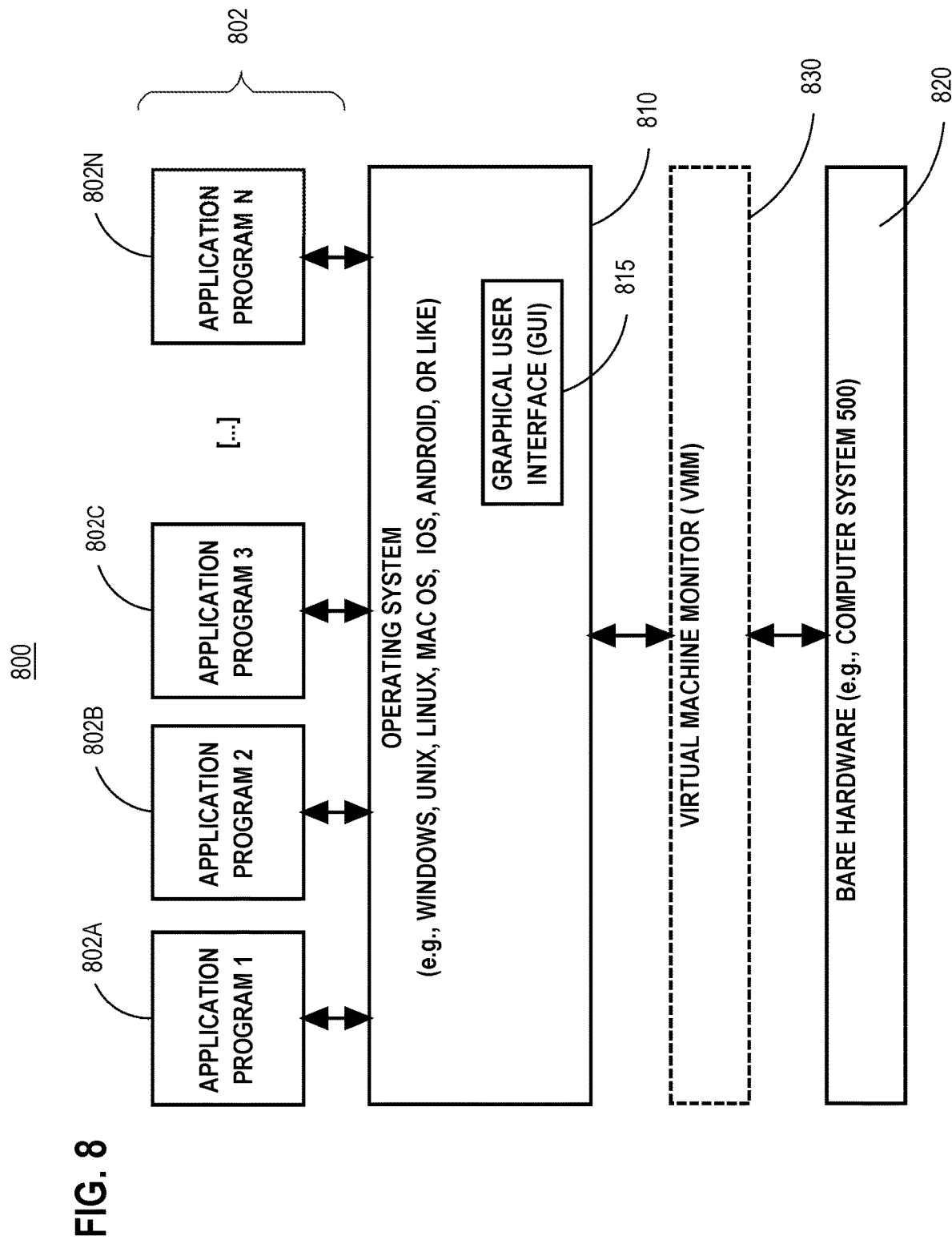
FIG. 8 is a block diagram of a basic software system, in one or more embodiments.
Figure 9:
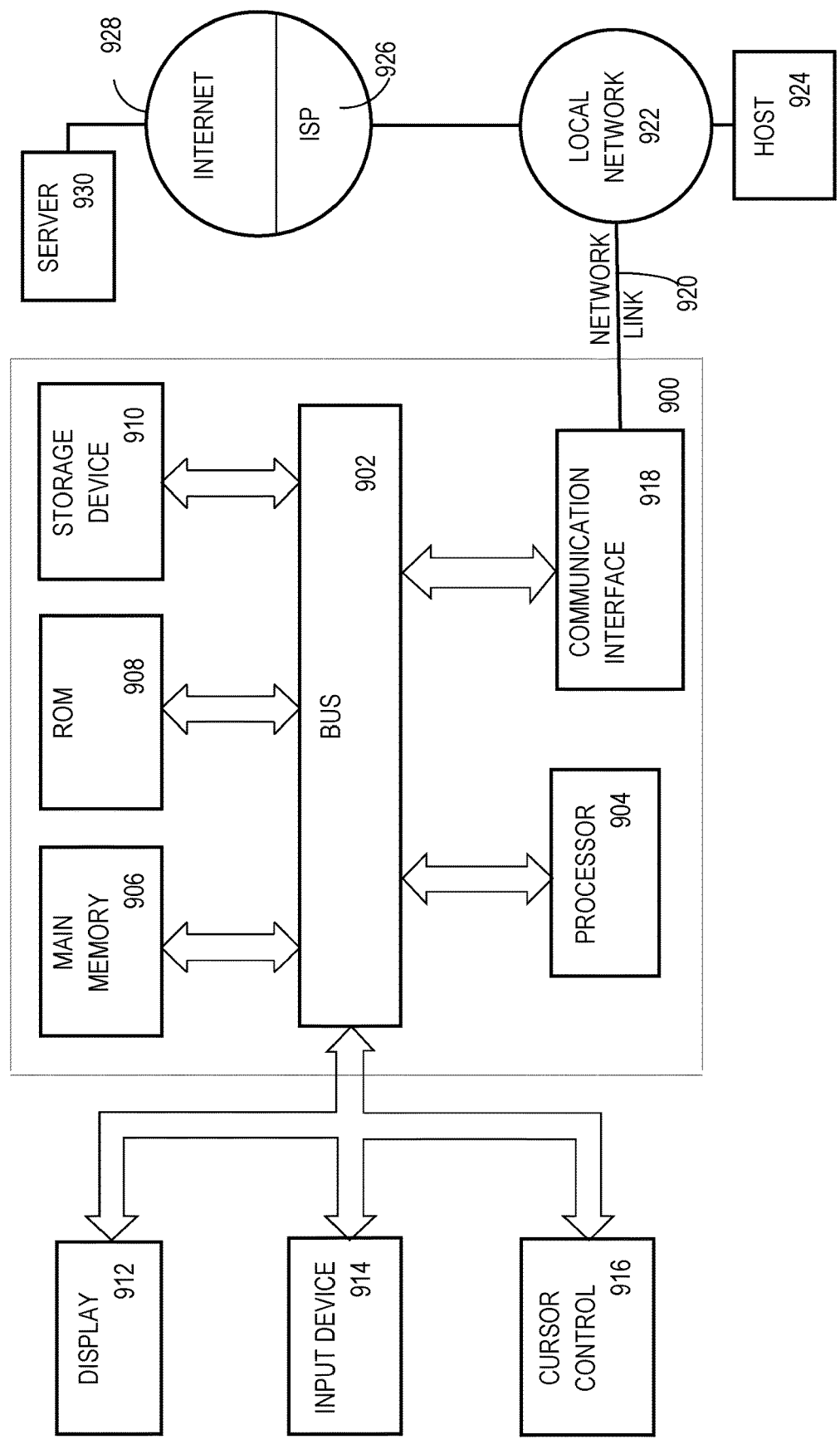
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or another communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   generating a first session template data structure that includes a first plurality of session attribute values, each of the first plurality of session attribute values describing an aspect of a first state of a first session that is established between a client system and a database management system (DBMS), and through which one or more first commands by the client system are issued to the database management system for a first execution;
   based at least in part on the first plurality of session attribute values, generating a first template identifier corresponding to the first session template data structure, wherein generating the first template identifier comprises generating a first hash-based signature, using a hash-based algorithm, based at least in part on the first plurality of session attribute values;
   wherein the first template identifier uniquely identifies at least the first plurality of session attribute values thereby identifying the first state of the first session;
   storing the first session template data structure in an association with the first template identifier;
   storing a first indication that the first state of the first session is associated with the first template identifier;
   capturing a second state of a second session by receiving a second plurality of session attribute values caused by a second execution that is different from the first execution;
   based at least in part on the second plurality of session attribute values, generating a second template identifier, wherein generating the second template identifier comprises generating a second hash-based signature, using the hash-based algorithm, based at least in part on the second plurality of session attribute values;
   wherein the second template identifier uniquely identifies at least the second plurality of session attribute values thereby identifying the second state of the second session; and
   based on comparing the first template identifier with the second template identifier, determining that the first state of the first session is the same as the second state of the second session thereby determining not to store the second plurality of session attribute values.

2. The method of claim 1, further comprising:
   storing a second indication associating the second state of the second session is associated with the first template identifier.

3. The method of claim 1, wherein the first session is different from the second session.

4. The method of claim 1,
   wherein the first session is established between the client system and a first database server of the DBMS; and
   wherein the second session is established between the client system and a second database server of the DBMS that is different from the first database server, and through which one or more second commands by the client system are issued to the database management system for the second execution.

5. The method of claim 1, further comprising:
   based on comparing the first template identifier with a third template identifier of the second session, determining to store a third plurality of session attribute values of the third template identifier of the second session;
   based on determining to store the third plurality of session attribute values:
     based at least in part on the third plurality of session attribute values, generating
     a second session template data structure, and
     storing the second session template data structure in an association with the third template identifier.

6. The method of claim 5, wherein the second session and the first session are a same session, and each of the third plurality of session attribute values describes a corresponding aspect of the first plurality of session attribute values at a different lifecycle point of the first session.

7. The method of claim 1, further comprising:
   capturing a third state by receiving a third plurality of session attribute values, different from the first plurality of session attribute values, caused by a third execution that is different from the first execution;
   based at least in part on the third plurality of session attribute values, generating a third template identifier; and
   based on comparing the first template identifier with the third template identifier, determining to store the third plurality of session attribute values;
   based on determining to store the third plurality of session attribute values:
     based at least in part on the third plurality of session attribute values, generating a
     third session template data structure, and
     storing the third session template data structure in an association with the third template identifier;
   wherein the first session template data structure and the third session template data structure are in a hierarchical relationship.

8. The method of claim 7, wherein the first plurality of session attribute values for the first session template data structure are updated more frequently than the third plurality of session attribute values for the third session template data structure.

9. The method of claim 7, wherein the hierarchical relationship is based on which components of the DBMS performed the first execution and the third execution.

10. The method of claim 7, wherein the first session template data structure is at a different level of the hierarchical relationship than the third session template data structure based on a different update frequency of the first plurality of session attribute values and the third plurality of session attribute values.

11. One or more non-transitory computer-readable media storing a set of instructions, wherein the set of instructions includes instructions, which when executed by one or more hardware processors, cause:
generating a first session template data structure that includes a first plurality of session attribute values, each of the first plurality of session attribute values describing an aspect of a first state of a first session that is established between a client system and a database management system (DBMS), and through which one or more first commands by the client system are issued to the database management system for a first execution;
based at least in part on the first plurality of session attribute values, generating a first template identifier corresponding to the first session template data structure, wherein generating the first template identifier comprises generating a first hash-based signature, using a hash-based algorithm, based at least in part on the first plurality of session attribute values;
wherein the first template identifier uniquely identifies at least the first plurality of session attribute values thereby identifying the first state of the first session;
storing the first session template data structure in an association with the first template identifier;
storing a first indication that the first state of the first session is associated with the first template identifier;
capturing a second state of a second session by receiving a second plurality of session attribute values caused by a second execution that is different from the first execution;
based at least in part on the second plurality of session attribute values, generating a second template identifier, wherein generating the second template identifier comprises generating a second hash-based signature, using the hash-based algorithm, based at least in part on the second plurality of session attribute values;
wherein the second template identifier uniquely identifies at least the second plurality of session attribute values thereby identifying the second state of the second session; and
based on comparing the first template identifier with the second template identifier, determining that the first state of the first session is the same as the second state of the second session thereby determining not to store the second plurality of session attribute values.

12. The one or more non-transitory computer-readable media of claim 11, wherein the set of instructions further includes instructions, which, when executed by said one or more hardware processors, cause:
storing a second indication associating the second state of the second session is associated with the first template identifier.

13. The one or more non-transitory computer-readable media of claim 11, wherein the first session is different from the second session.

14. The one or more non-transitory computer-readable media of claim 11,
wherein the first session is established between the client system and a first database server of the DBMS; and
wherein the second session is established between the client system and a second database server of the DBMS that is different from the first database server, and through which one or more second commands by the client system are issued to the database management system for the second execution.

15. The one or more non-transitory computer-readable media of claim 11, wherein the set of instructions further includes instructions, which, when executed by said one or more hardware processors, cause:
based on comparing the first template identifier with a third template identifier of the second session, determining to store a third plurality of session attribute values of the third template identifier of the second session;
based on determining to store the third plurality of session attribute values:
based at least in part on the third plurality of session attribute values, generating
a second session template data structure, and
storing the second session template data structure in an association with the third template identifier.

16. The one or more non-transitory computer-readable media of claim 15, wherein the second session and the first session are a same session, and each of the third plurality of session attribute values describes a corresponding aspect of the first plurality of session attribute values at a different lifecycle point of the first session.

17. The one or more non-transitory computer-readable media of claim 11, wherein the set of instructions further includes instructions, which, when executed by said one or more hardware processors, cause:
capturing a third state by receiving a third plurality of session attribute values, different from the first plurality of session attribute values, caused by a third execution that is different from the first execution;
based at least in part on the third plurality of session attribute values, generating a third template identifier; and
based on comparing the first template identifier with the third template identifier, determining to store the third plurality of session attribute values;
based on determining to store the third plurality of session attribute values:
based at least in part on the third plurality of session attribute values, generating a
third session template data structure, and
storing the third session template data structure in an association with the third template identifier;
wherein the first session template data structure and the third session template data structure are in a hierarchical relationship.

18. The one or more non-transitory computer-readable media of claim 17, wherein the first plurality of session attribute values for the first session template data structure are updated more frequently than the third plurality of session attribute values for the third session template data structure.

19. The one or more non-transitory computer-readable media of claim 17, wherein the hierarchical relationship is based on which components of the DBMS performed the first execution and the third execution.

20. The one or more non-transitory computer-readable media of claim 17, wherein the first session template data structure is at a different level of the hierarchical relationship than the third session template data structure based on a different update frequency of the first plurality of session attribute values and the third plurality of session attribute values.

* * * * *